United States Patent
Taherzadeh Boroujeni et al.

(10) Patent No.: US 11,785,638 B2
(45) Date of Patent: Oct. 10, 2023

(54) MESSAGE TWO CONTROL CHANNEL REPETITION FOR CONTENTION FREE RANDOM ACCESS

(71) Applicant: QUALCOMM Incorporated, San Diego, CA (US)

(72) Inventors: Mahmoud Taherzadeh Boroujeni, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 219 days.

(21) Appl. No.: 17/468,620

(22) Filed: Sep. 7, 2021

(65) Prior Publication Data

US 2023/0074129 A1    Mar. 9, 2023

(51) Int. Cl.
*H04W 24/10* (2009.01)
*H04W 74/04* (2009.01)
*H04W 72/23* (2023.01)

(52) U.S. Cl.
CPC ........... *H04W 74/04* (2013.01); *H04W 24/10* (2013.01); *H04W 72/23* (2023.01)

(58) Field of Classification Search
CPC ...... H04W 74/04; H04W 72/23; H04W 24/10
USPC ........................................................ 370/329
See application file for complete search history.

(56) References Cited

U.S. PATENT DOCUMENTS

2020/0404708 A1*  12/2020  Zhang ................... H04W 16/14

FOREIGN PATENT DOCUMENTS

KR       20200047690      *  9/2018  ............ H04W 68/02

\* cited by examiner

*Primary Examiner* — Christopher R Crompton
(74) *Attorney, Agent, or Firm* — Holland & Hart LLP

(57) ABSTRACT

Methods, systems, and devices for wireless communications are described. A user equipment (UE) and a base station may perform a contention-free random access (CFRA) procedure to establish a connection. The base station may transmit control signaling indicating a configuration for a first message of the CFRA including a preamble. The UE may transmit the first message in accordance with the configuration. The preamble of the first message may indicate a request for the base station to use repetition to transmit downlink control information (DCI) that schedules a second message of the CFRA procedure. In some examples, the UE may transmit the first message based on determining that one or more measurement values satisfy one or more thresholds. In response to the request, the base station may transmit one or more repetitions of the DCI and may transmit the second message of the CFRA procedure in accordance with the DCI.

30 Claims, 16 Drawing Sheets

MESSAGE TWO CONTROL CHANNEL REPETITION FOR CONTENTION FREE RANDOM ACCESS

FIELD OF TECHNOLOGY

The following relates to wireless communications, including message two control channel repetition for contention free random access.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In order to establish uplink synchronization and radio resource control (RRC) connection with a base station, a UE may undergo a random access procedure (e.g., a contention-free random access (CFRA) procedure or contention-based random access (CBRA) procedure). During the random access procedure, the UE and the base station may exchange multiple random access messages and the success of the random access procedure may hinge on successful receipt of these random access messages.

SUMMARY

The described techniques relate to improved methods, systems, devices, and apparatuses that support message two control channel repetition for contention free random access (CFRA). Generally, the described techniques provide for a user equipment (UE), performing a CFRA procedure with a base station, to request repetition of a physical downlink control channel (PDCCH) message (e.g., downlink control information (DCI)) that schedules a second message of the CFRA procedure. For example, the UE may transmit a first message (which may be referred to as a Msg1) of the CFRA procedure that includes a preamble and indicates a request for the base station to use repetition to transmit DCI that schedules a second message (which may be referred to as a Msg2) of the CFRA procedure. The base station may transmit one or more repetitions of the DCI to the UE, and may transmit the Msg2 in accordance with the DCI.

In some cases, the UE may receive (e.g., as part of control signaling) a configuration for the first message (which may be or include a preamble) that indicates how the request for repetition is indicated. For example, the configuration may indicate a preamble to use (e.g., from a set of preambles) that is associated with the use of repetition of the DCI. Additionally, or alternatively, the configuration may indicate a random access occasion, a preamble format, a quantity of repetitions of the preamble, a transmission method, or some other example, that is associated with the use of repetition. By transmitting the preamble in accordance with the configuration, the UE may indicate (e.g., implicitly), to the base station, the request for repetition of the DCI. In some examples, the UE may request the repetition based on one or more thresholds being satisfied, a deployment mode, a subcarrier spacing, an operating frequency range, or some combination thereof, among other examples A method for wireless communications at a UE is described. The method may include receiving control signaling identifying a configuration for a first message of a CFRA procedure, the first message including a preamble, transmitting the first message according to the configuration, where the preamble of the first message indicates a request for the base station to use repetition to transmit DCI that schedules a second message of the CFRA procedure, receiving one or more repetitions of the DCI in response to the request, and receiving the second message of the CFRA procedure based on the received one or more repetitions of the DCI.

An apparatus for wireless communications at a UE is described. The apparatus may include a processor, memory coupled with the processor, and instructions stored in the memory. The instructions may be executable by the processor to cause the apparatus to receive control signaling identifying a configuration for a first message of a CFRA procedure, the first message including a preamble, transmit the first message according to the configuration, where the preamble of the first message indicates a request for the base station to use repetition to transmit DCI that schedules a second message of the CFRA procedure, receive one or more repetitions of the DCI in response to the request, and receive the second message of the CFRA procedure based on the received one or more repetitions of the DCI.

Another apparatus for wireless communications at a UE is described. The apparatus may include means for receiving control signaling identifying a configuration for a first message of a CFRA procedure, the first message including a preamble, means for transmitting the first message according to the configuration, where the preamble of the first message indicates a request for the base station to use repetition to transmit DCI that schedules a second message of the CFRA procedure, means for receiving one or more repetitions of the DCI in response to the request, and means for receiving the second message of the CFRA procedure based on the received one or more repetitions of the DCI.

A non-transitory computer-readable medium storing code for wireless communications at a UE is described. The code may include instructions executable by a processor to receive control signaling identifying a configuration for a first message of a CFRA procedure, the first message including a preamble, transmit the first message according to the configuration, where the preamble of the first message indicates a request for the base station to use repetition to transmit DCI that schedules a second message of the CFRA procedure, receive one or more repetitions of the DCI in response to the request, and receive the second message of the CFRA procedure based on the received one or more repetitions of the DCI.

In some examples of the method, apparatuses, and non-transitory computer-readable medium described herein, receiving the control signaling identifying the configuration for the first message may include operations, features, means, or instructions for receiving an indication of a first preamble from a set of preambles, a random access occasion from a set of random access occasions, a transmission technique for the preamble from a set of transmission techniques, a format of a set of formats for the preamble, a quantity of repetitions of the preamble, or any combination thereof, that may be associated with the use of repetition to transmit the DCI that schedules the second message.

In some examples of the method, apparatuses, and non-transitory computer-readable medium described herein, transmitting the first message based on the configuration may include operations, features, means, or instructions for transmitting the first message indicating the request based on determining that one or more measurement values associated with one or more thresholds may be satisfied.

Some examples of the method, apparatuses, and non-transitory computer-readable medium described herein may further include operations, features, means, or instructions for determining a reference signal received power (RSRP) value based on a measurement value of a synchronization signal received from the base station and comparing the RSRP value with the one or more thresholds to determine the measurement value.

In some examples of the method, apparatuses, and non-transitory computer-readable medium described herein, the one or more measurement values, the one or more thresholds, or both may be based on one or more channel state information (CSI) measurements performed before a start of the CFRA procedure.

In some examples of the method, apparatuses, and non-transitory computer-readable medium described herein, the configuration includes an indication of the one or more thresholds.

Some examples of the method, apparatuses, and non-transitory computer-readable medium described herein may further include operations, features, means, or instructions for receiving control signaling identifying one or more communications parameters associated with the one or more repetitions of the DCI, where receiving the one or more repetitions of the DCI may be based on the one or more communications parameters.

In some examples of the method, apparatuses, and non-transitory computer-readable medium described herein, the one or more communications parameters include a frequency hopping pattern, a beam sweeping pattern, a quantity of the one or more repetitions, a grouping of monitoring occasions, or any combination thereof.

In some examples of the method, apparatuses, and non-transitory computer-readable medium described herein, transmitting the first message may include operations, features, means, or instructions for transmitting the first message based on the configuration and one or more of a frequency range, a subcarrier spacing, a deployment mode, or any combination thereof.

Some examples of the method, apparatuses, and non-transitory computer-readable medium described herein may further include operations, features, means, or instructions for transmitting an indication of a capability of the UE to receive the one or more repetitions of the DCI that schedules the second message of the CFRA procedure, where transmitting the first message indicating the request may be based on the capability.

Some examples of the method, apparatuses, and non-transitory computer-readable medium described herein may further include operations, features, means, or instructions for monitoring, after transmitting the request for the base station to use repetition to transmit the DCI, both a first set of resources for the one or more repetitions of the DCI and a second set of resources for a single instance of the DCI, the one or more repetitions of the DCI received based on the monitoring.

In some examples of the method, apparatuses, and non-transitory computer-readable medium described herein, transmitting the first message may include operations, features, means, or instructions for transmitting the first message, where the preamble of the first message includes an indication for the UE to transmit, to the base station, a third message of the CFRA procedure using repetition, where the indication for the UE to transmit the third message using repetition indicates the request for the base station to use repetition to transmit the DCI that schedules the second message.

A method for wireless communications at a base station is described. The method may include transmitting, to a UE, control signaling identifying a configuration for a first message of a CFRA procedure, the first message including a preamble, receiving the first message according to the configuration, where the preamble of the first message indicates a request for the base station to use repetition to transmit DCI that schedules a second message of the CFRA procedure, transmitting one or more repetitions of the DCI in response to the request, and transmitting the second message of the CFRA procedure according to the transmitted DCI.

An apparatus for wireless communications at a base station is described. The apparatus may include a processor, memory coupled with the processor, and instructions stored in the memory. The instructions may be executable by the processor to cause the apparatus to transmit, to a UE, control signaling identifying a configuration for a first message of a CFRA procedure, the first message including a preamble, receive the first message according to the configuration, where the preamble of the first message indicates a request for the base station to use repetition to transmit DCI that schedules a second message of the CFRA procedure, transmit one or more repetitions of the DCI in response to the request, and transmit the second message of the CFRA procedure according to the transmitted DCI.

Another apparatus for wireless communications at a base station is described. The apparatus may include means for transmitting, to a UE, control signaling identifying a configuration for a first message of a CFRA procedure, the first message including a preamble, means for receiving the first message according to the configuration, where the preamble of the first message indicates a request for the base station to use repetition to transmit DCI that schedules a second message of the CFRA procedure, means for transmitting one or more repetitions of the DCI in response to the request, and means for transmitting the second message of the CFRA procedure according to the transmitted DCI.

A non-transitory computer-readable medium storing code for wireless communications at a base station is described. The code may include instructions executable by a processor to transmit, to a UE, control signaling identifying a configuration for a first message of a CFRA procedure, the first message including a preamble, receive the first message according to the configuration, where the preamble of the first message indicates a request for the base station to use repetition to transmit DCI that schedules a second message of the CFRA procedure, transmit one or more repetitions of the DCI in response to the request, and transmit the second message of the CFRA procedure according to the transmitted DCI.

In some examples of the method, apparatuses, and non-transitory computer-readable medium described herein, transmitting the control signaling identifying the configuration for the first message may include operations, features, means, or instructions for transmitting an indication of a first preamble from a set of preambles, a random access occasion from a set of random access occasions, a transmission technique for the preamble from a set of transmission techniques, a format of a set of formats for the preamble, a quantity of repetitions of the preamble, or any combination thereof, that may be associated with the use of repetition to transmit the DCI that schedules the second message.

In some examples of the method, apparatuses, and non-transitory computer-readable medium described herein, receiving the first message based on the configuration may include operations, features, means, or instructions for receiving the first message indicating the request based on one or more measurement values associated with one or more thresholds being satisfied.

In some examples of the method, apparatuses, and non-transitory computer-readable medium described herein, the configuration includes an indication of the one or more thresholds.

Some examples of the method, apparatuses, and non-transitory computer-readable medium described herein may further include operations, features, means, or instructions for transmitting control signaling identifying one or more communications parameters associated with the one or more repetitions of the DCI, where transmitting the one or more repetitions of the DCI may be based on the one or more communications parameters.

In some examples of the method, apparatuses, and non-transitory computer-readable medium described herein, the one or more communications parameters include a frequency hopping pattern, a beam sweeping pattern, a quantity of the one or more repetitions, a grouping of monitoring occasions, or any combination thereof.

In some examples of the method, apparatuses, and non-transitory computer-readable medium described herein, receiving the first message may include operations, features, means, or instructions for receiving the first message based on the configuration and one or more of a frequency range, a subcarrier spacing, a deployment mode, or any combination thereof.

Some examples of the method, apparatuses, and non-transitory computer-readable medium described herein may further include operations, features, means, or instructions for receiving an indication of a capability of the UE to receive the one or more repetitions of the DCI that schedules the second message of the CFRA procedure.

In some examples of the method, apparatuses, and non-transitory computer-readable medium described herein, receiving the first message may include operations, features, means, or instructions for receiving the first message, where the preamble of the first message includes an indication for the UE to transmit, to the base station, a third message of the CFRA procedure using repetition, where the indication for the UE to transmit the third message using repetition indicates the request for the base station to use repetition to transmit the DCI that schedules the second message.

DETAILED DESCRIPTION

Figure 1:
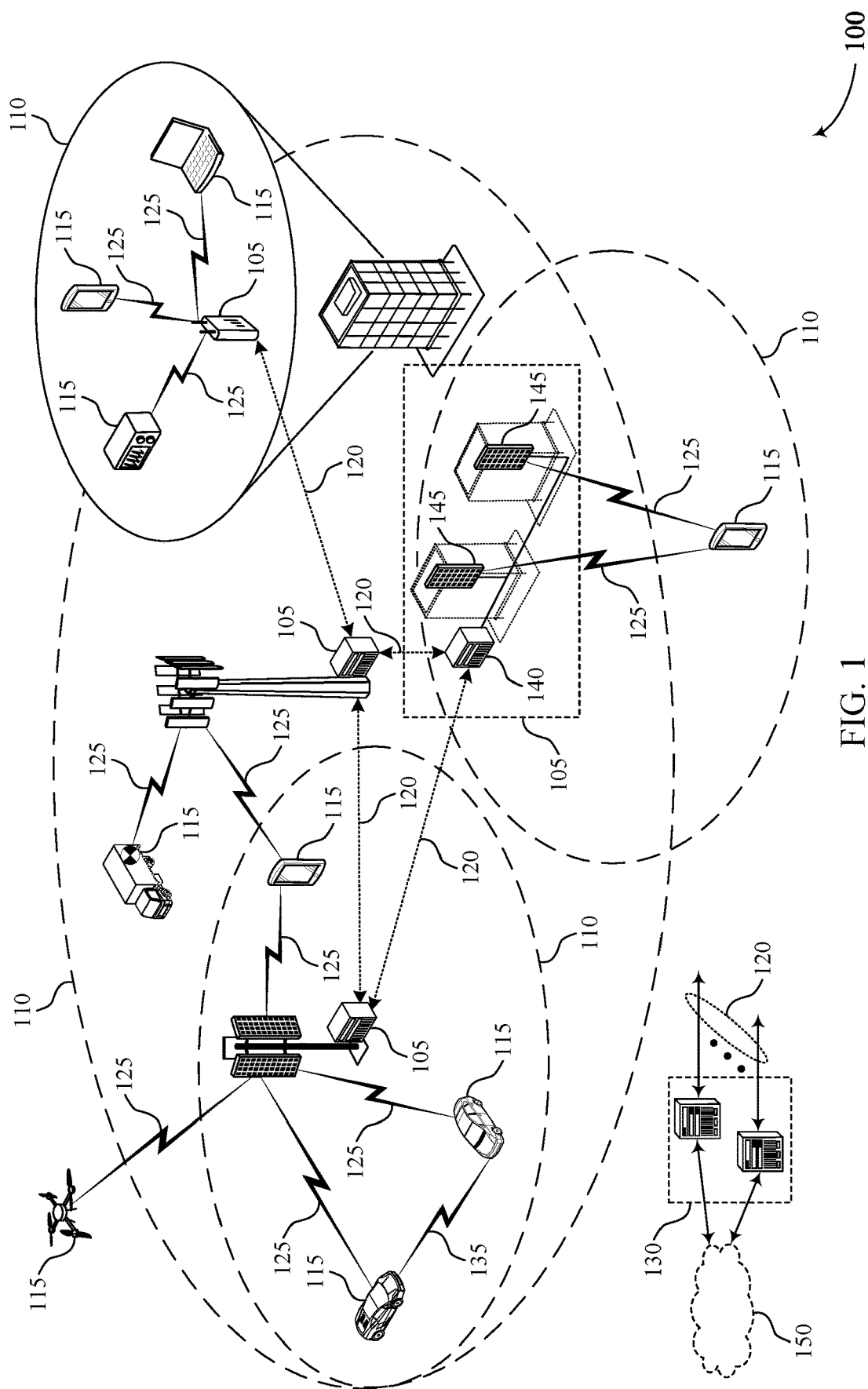
FIG. 1 illustrates an example of a wireless communications system that supports message two control channel repetition for contention free random access (CFRA) in accordance with aspects of the present disclosure.

A user equipment (UE) and a base station (such as a eNodeB (eNB), a next-generation NodeB or giga-NodeB (either of which may be referred to as a gNB)) may establish a connection using a random access procedure. In some examples, the random access procedure may use contention between UEs and may be referred to as contention-based random access (CBRA). In other examples, the random access procedure may lack contention between UEs, which may be referred to as a contention-free random access (CFRA) procedure. The random access procedure may include a series of handshake messages carrying information that facilitates establishing the connection between the UE and the base station. For instance, the base station may configure the UE with a preamble allocated to the UE for a CFRA procedure. The UE may transmit a first message of the CFRA procedure, such as a random access request message (e.g., Msg1), to the base station, the random access request message including the allocated preamble. To acknowledge receipt of the preamble, the base station may transmit a second message (e.g., a random access response message, a Msg2) including a resource grant for communications between the UE and the base station. The second message may include information such as timing alignment information, an RA preamble identifier (RAPID), etc. Upon receiving the second message from the base station, the UE may consider itself in connected mode with the base station and may transmit a third message (e.g., Msg3) to the base station over resources assigned in the second message. In some examples, the third message may include a cell radio network temporary identifier (C-RNTI) allocated to the UE.

As CFRA procedures rely on handshake messages between the UE and the base station to successfully establish a connection, failure to receive an individual CFRA message may delay the entire CFRA procedure or, in some cases, may cause the CFRA procedure to fail. For example, the UE may fail to receive the second message from the base station due to blockages, interference, or other scenarios, and the UE may not be able to proceed with the CFRA procedure, thus rendering the UE unable to connect with the base station. Delay or failure of the CFRA procedure may increase latency in the system. Improved reliability of CFRA procedures may result in improved coverage and system efficiency. Accordingly, the techniques described herein support the use of repetition in a CFRA procedure, which may increase the likelihood that a message is correctly received and decoded. That is, transmitting a message using repetition may increase the probability of the UE successfully receiving the message, for example by increasing the probability that the UE successfully decode based on multiple instances of the repetitions. For instance, a temporary blockage may prevent the UE from receiving all or a portion of an initial transmission of the message, but a subsequent repetition may provide sufficient signal alone or together with a portion of the initial transmission to be received at the UE for successful decoding of the message. A UE performing a CFRA procedure with a base station may request that the base station use repetition to transmit a message of the CFRA procedure, which may improve reliability of the CFRA procedure and enable the UE to successfully connect to the base station.

The base station may configure the UE with a preamble that the UE may use to request repetition. In some examples, the base station may transmit a configuration for the first message including the preamble, where the configuration indicates a preamble, a random access occasion, a transmission technique for the preamble, a preamble format, a quantity of repetitions of the preamble, or a combination thereof, among other examples, that is associated with the use of repetition to transmit the DCI. Here, by transmitting the preamble as part of the first message of the CFRA procedure in accordance with the configuration, the UE may indicate a request for the base station to use repetition to transmit downlink control information (DCI) that schedules the second message of the CFRA procedure. In response to receiving the request (e.g., in, with, or as the preamble), the base station may transmit, to the UE, one or more repetitions of the DCI. The base station may transmit the second message in accordance with scheduling information indicated by the DCI.

In some cases, the UE may transmit the preamble indicating a request for repetition based on determining that one or more measurement values satisfy one or more thresholds. For example, the UE may perform measurements to obtain measurement values or may determine previously-performed measurement values, and may compare the measurement values against the one or more thresholds; if the one or more thresholds are satisfied, the UE may request repetition. Additionally, or alternatively, the UE may request repetition based on an associated frequency range, deployment mode, or subcarrier spacing. In some examples, the base station may transmit the one or more repetitions in accordance with one or more communications parameters, such as a frequency hopping pattern, a beam sweeping pattern, a quantity of repetitions, a grouping of monitoring occasions, or the like.

Aspects of the disclosure are initially described in the context of wireless communications systems. Aspects of the disclosure are then discussed with reference to process flows. Aspects of the disclosure are further illustrated by and described with reference to apparatus diagrams, system diagrams, and flowcharts that relate to message two control channel repetition for contention free random access.

FIG. 1 illustrates an example of a wireless communications system 100 that supports message two control channel repetition for CFRA in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications.

The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 may perform a connection procedure (such as an RRC procedure, a cell acquisition procedure, a random access procedure, an RRC connection procedure, an RRC configuration procedure) with a UE 115. For example, a base station 105 and a UE 115 may perform a random access procedure (e.g., a random access channel (RACH) procedure, such as a physical RACH (PRACH) procedure) to establish a connection. In some other examples, a base station 105 and a UE 115 may perform a random access procedure to re-establish a connection after a connection failure (such as a radio-link failure) with the base station 105, or to establish a connection for handover to another base station 105, or the like. Random access procedures may be based on an SSB, channel state information reference signals (CSI-RSs), or a combination thereof.

To initiate the random access procedure, a UE 115 may transmit a first message (e.g., Msg1) that includes a random access preamble (also referred to a RACH preamble, a physical random access channel (PRACH) preamble, or a sequence). Some implementations of a random access procedure may be contention-based (e.g., CBRA) or contention-free (e.g., CFRA). When performing a CBRA procedure (also referred to as a 4-step random access procedure), the UE 115 and any other UEs 115 attempting random access with the base station 105 may randomly select a preamble from a set of sequences. Accordingly, two (or more) UEs 115 may inadvertently select a same preamble sequence, which may result in contention between the UEs 115. The base station 105 may resolve such contention at a final step of the CBRA procedure.

Alternatively, in CFRA (also referred to as a 3-step random access procedure), the base station 105 may assign a specific preamble and associated resources on which to transmit the preamble to the UE 115. The base station 105 may, prior to the UE 115 transmitting the preamble, transmit (e.g., via control signaling) an indication of the assigned preamble and resources, as well as preamble configuration information (e.g., a preamble format, a random access occasion, time resources, frequency resources, or the like), to the UE 115. The UE 115 may calculate a random access radio network temporary identifier (RA-RNTI) based on the assigned preamble. The UE 115 may transmit the first message including the preamble in accordance with the preamble configuration; the UE may also include the RA-RNTI as part of the preamble, which may enable the base station 105 to distinguish between multiple UEs 115 transmitting preambles simultaneously.

Based on receiving the preamble, the base station 105 may respond by transmitting control signaling (e.g., via a physical downlink control channel (PDCCH)) that schedules a second message (e.g., Msg2) of the CFRA procedure; the second message may be transmitted via a physical downlink shared channel (PDSCH). The control signaling may include or may be an example of DCI indicating scheduling information for the second message, such that the base station transmits the second message in accordance with the DCI. The second message may be a random access response message that provides a scheduling grant for the UE 115 to use for a next uplink transmission (e.g., a subsequent random access message), a timing advance parameter, a network identifier (e.g., a temporary cell-specific radio network temporary identifier (C-RNTI)), or the like. Based on receiving the second message, the UE 115 may transmit a third message (Msg3) of the CFRA procedure; the third message may include additional connection establishment information.

According to the techniques described herein, the UE 115 may include a preamble in the first message of a CFRA procedure that indicates a request for the base station 105 to use repetition to transmit the DCI that schedules the second message. In some examples, the preamble configuration information transmitted from the base station 105 to the UE 115 may include a configuration for a preamble associated with the request for repetition. For instance, the configuration may indicate a preamble (e.g., from a set of preambles), a random access occasion (e.g., from a set of random access occasions), a transmission technique, a preamble format, a quantity of repetitions of the preamble, or a combination thereof, that is associated with the use of repetition to transmit the DCI scheduling the second message. Accordingly, the UE 115 may indicate the request for repetition by transmitting the preamble in accordance with the configuration.

The base station 105 receiving the preamble may grant the request and may transmit one or more repetitions of the DCI to the UE 115. In some examples, the base station 105 may transmit the one or more repetitions in accordance with one or more communications parameters, which may be preconfigured and/or indicated to the UE 115. The UE 115 may monitor for and receive the one or more repetitions of the DCI. In some cases, the base station 105 may choose not to grant the request and may transmit a single instance of the DCI; to account for such cases, the UE 115 may monitor a set of resources associated with a single instance of the DCI, in addition to those monitored for the one or more repetitions.

Figure 2:
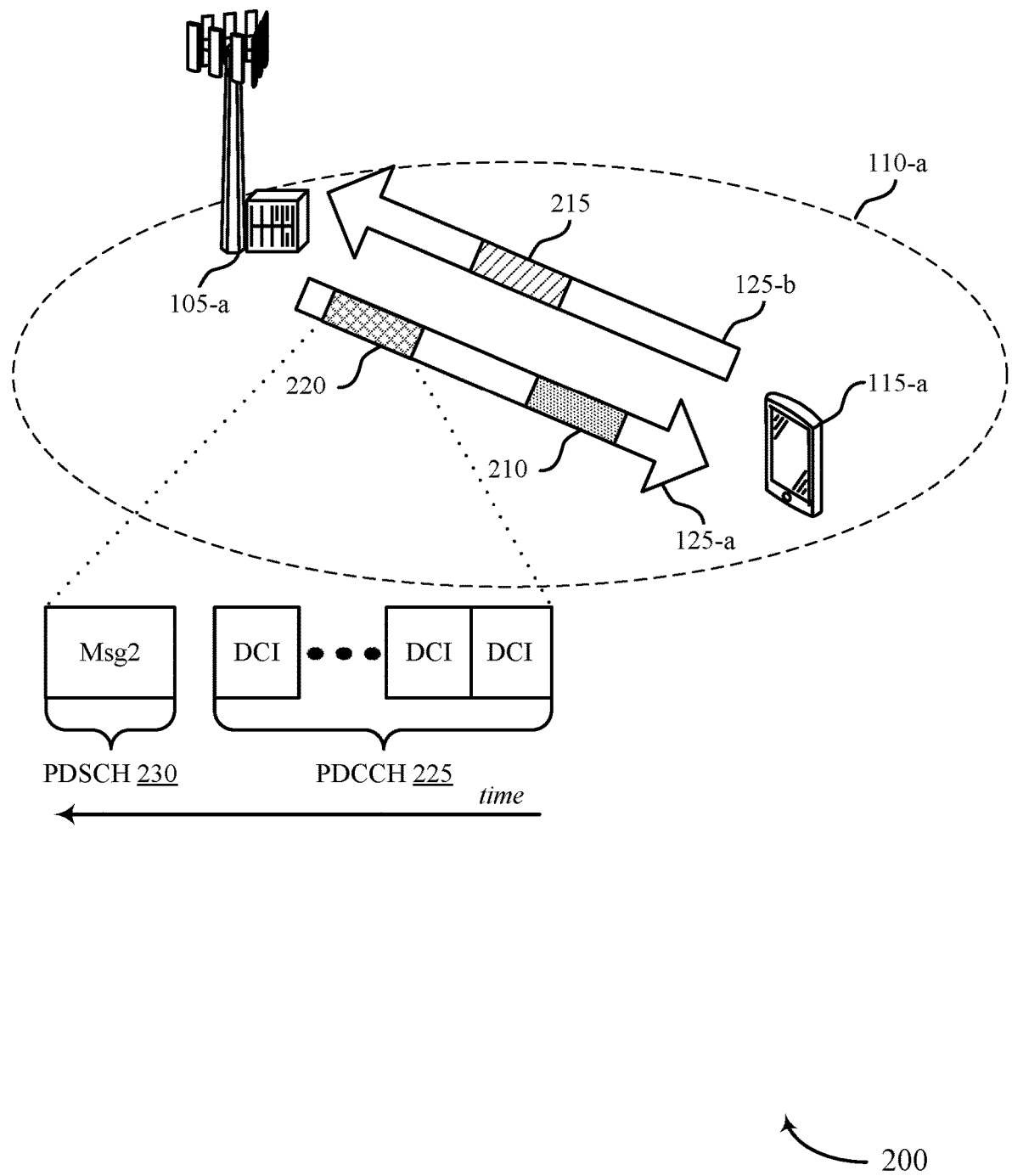
FIG. 2 illustrates an example of a wireless communications system that supports message two control channel repetition for CFRA in accordance with aspects of the present disclosure.

FIG. 2 illustrates an example of a wireless communications system 200 that supports message two control channel repetition for CFRA in accordance with aspects of the present disclosure. The wireless communications system 200 may include a base station 105-a, a UE 115-a, and a coverage area 110-a, which may be examples of the corresponding devices and concepts described herein. In some implementations, the wireless communications system 200 may implement aspects of the wireless communications system 100. For example, the base station 105-a and the UE 115-a may perform connectivity establishment via a random access procedure.

The base station 105-a and the UE 115-a may communicate via communication links 125. For example, the base station 105-*a* may transmit downlink transmissions, such as PDCCH transmissions or PDSCH transmissions, via communication link 125-*a*, which may be an example of a downlink communication link. Likewise, the UE 115-*a* may transmit uplink transmissions, such as PUCCH transmissions or PUSCH transmissions, to the base station 105-*a* via communication link 125-*a*, which may be an example of an uplink communication link. To establish communications, the base station 105-*a* may perform a connection procedure (such as an RRC procedure, such as a cell acquisition procedure, a random access procedure, an RRC connection procedure, an RRC configuration procedure) with the UE 115-*a*.

For example, base station 105-*a* and UE 115-*a* may perform a random access procedure to establish a connection for wired or wireless communication. Alternatively, the base station 105-*a* and the UE 115-*a* may perform a random access procedure to re-establish a connection after a connection failure (such as a radio-link failure), or to establish a connection for handover to another base station, or the like. The base station 105-*a* and the UE 115-*a* may support multiple radio access technologies including 4G systems such as LTE systems, LTE-A systems, or LTE-A Pro systems, and 5G systems which may be referred to as NR systems, and the connection procedure (e.g., the random access procedure) between the base station 105-*a* and the UE 115-*a* may correspond to, for example, at least one of the example radio access technologies.

As part of the random access procedure, the base station 105-*a* and the UE 115-*a* may exchange one or more random access messages (handshake messages). In some examples, such as in CFRA procedures, the base station 105-*a* may initially (e.g., prior to the random access procedure) transmit control signaling 210 to the UE 115-*a* that includes configuration information and parameters related to the CFRA procedure. For example, the base station 105-*a* may allocate resources and a random access preamble to the UE 115-*a* for use in the random access procedure, e.g., in subsequent random access messages. The control signaling 210 may include an indication of the resource allocation information and an indication of the random access preamble assigned to the UE 115-*a*.

The CFRA may be initiated by the base station 105-*a* or the UE 115-*a*. For instance, the base station 105-*a* may transmit control signaling (e.g., via PDCCH) to the UE 115-*a* instructing the UE 115-*a* to initiate the CFRA, or a MAC entity at the UE 115-*a* may determine to initiate the CFRA to connect to the base station 105-*a*. The UE 115-*a* may begin the random access procedure by transmitting a first random access message 215, which may include the preamble indicated by the control signaling 210. The preamble may carry information, such as a UE identifier. The purpose of the preamble transmission may be to provide an indication to the base station 105-*a* of the presence of a random access attempt, and to allow the base station 105-*a* to determine a delay (such as a timing delay) between the base station 105-*a* and the UE 115-*a*.

The preamble of the first random access message 215 may, in some implementations, be defined by a preamble sequence and a cyclic prefix. A preamble sequence may be one of a set of sequences known to both UE 115-*a* and base station 105-*a*, for example defined based in part on a Zadoff-Chu sequence, though other sequences may be used consistent with the techniques described herein. The UE 115-*a* may additionally, or alternatively, use a guard period to handle timing uncertainty of the first random access message 215 transmission. For example, before beginning the random access procedure, the UE 115-*a* may obtain downlink synchronization with the base station 105-*a* based in part on a cell-search procedure. However, because the UE 115-*a* has not yet obtained uplink synchronization with the base station 105-*a*, there may be an uncertainty in uplink timing due to the location of the UE 115-*a* in the cell (e.g., the coverage area 110-*a*) not being known. In some implementations, the uncertainty in uplink timing may be based in part on a dimension (such as a size or area) of the cell. In such implementations, the UE 115-*a* may include a cyclic prefix to the first random access message 215 to handle the uncertainty in uplink timing.

Per cell, there may be a number of preamble sequences (such as 64 preamble sequences). In some examples, the UE 115-*a* may select a preamble sequence from a set of sequences in a cell (e.g., coverage area 110-*a*) based on a random selection. In some implementations, the UE 115-*a* may select a preamble sequence based on an amount of traffic that the UE 115-*a* has for transmission on an uplink shared channel. Based on the selected preamble sequence, the base station 105-*a* may determine the amount of uplink resources to be granted to the UE 115-*a*. In some other examples, the UE 115-*a* may select a preamble sequence based on an indication from the base station 105-*a*, e.g., included in the control signaling 210. If the UE 115-*a* is performing a CFRA attempt, for example, the UE 115-*a* may use a preamble sequence that was explicitly signaled by the base station 105-*a* in the control signaling 210. To avoid collisions or interference, the base station 105-*a* may select a contention-free preamble sequence (e.g., from sequences not associated with a CBRA attempt).

Upon receiving the first random access message 215, the base station 105-*a* may respond with a second random access message 220 (e.g., Msg2), e.g., to acknowledge receipt of the first random access 215. The second random access message 220 may include a PDCCH transmission 225 (i.e., control signaling) and a PDSCH transmission 230. For instance, the PDCCH transmission 225 may include DCI that schedules the associated PDSCH transmission 230. In some implementations, the second random access message 220 may have a same or a different configuration (format) compared to the first random access message 215. The second random access message 220 may carry information for the UE 115-*a*, where the information is determined by the base station 105-*a* based in part on information carried in the first random access message 215. For example, the information in the second random access message 220 may include an index of a preamble sequence detected and for which the response is valid, a timing advance parameter determined based in part on the preamble sequence detected, a scheduling grant indicating time and frequency resources for the UE 115-*a* to use for transmission of a next random access message transmission by the UE 115-*a*, or a network identifier (such as a random access RNTI (RA-RNTI)) for further communication with the UE 115-*a*, or the like.

In some examples, the UE 115-*a* may monitor one or more sets of resources for a random access message transmission (e.g., the second random access message 220) from the base station 105-*a* during a random access response window, which may be fixed or variable in size. For example, if the UE 115-*a* does not detect and receive a random access message transmission from the base station 105-*a* after transmitting the first random access message 215, the random access attempt may be associated with a failure and the random access procedure in FIG. 2 may repeat. However, in the subsequent attempt, the random access response window may be adjusted (such as increased or decreased in length (duration)).

Once the UE 115-*a* successfully receives the second random access message 220, the UE 115-*a* may consider the random access procedure successful (e.g., connection has been established) and may obtain uplink synchronization with the base station 105-*a*. In some examples, before data transmission from the UE 115-*a*, the base station 105-*a* may assign a unique identifier within the cell (such as a C-RNTI or a UE-specific identifier) to the UE 115-*a*. In some implementations, depending on a state (such as a connected_state, ideal_state) of the UE 115-*a*, additional messages (such as a connection request message) may be exchanged for setting up the connection between the base station 105-*a* and the UE 115-*a*. The UE 115-*a* may transmit any additional messages and/or data messages to the base station 105-*a* using the uplink resources indicated in the second random access message 220.

In some examples, however, the random access procedure illustrated in FIG. 2 may fail. For example, the base station 105-*a* may fail to receive the first random access message 215 and may therefore be unaware that the random access procedure has been initiated by the UE 115-*a*. The base station 105-*a* may not transmit a second random access message 220; the UE 115-*a*, after not detecting any second random access message 220, may consider the random access procedure a failure and may retransmit the first random access message 215 in a subsequent random access attempt. Alternatively, the UE 115-*a* may fail to receive the second random access message 220; in absence of a second random access message 220, the UE 115-*a* may be unable to confirm that the base station 105-*a* received the first random access message 215 and/or may lack information (e.g., included in a second random access message 220) needed to finalize connection establishment. In such cases, the UE 115-*a* may consider the random access procedure to be failed and may restart the random access attempt. In both scenarios, failure of the random access procedure may introduce significant latency, as connection establishment between the UE 115-*a* and the base station 105-*a* is delayed.

Accordingly, the techniques described herein facilitate the use of repetition (e.g., coverage enhancement) in random access procedures, such as CFRA procedures. In the example of FIG. 2, the UE 115-*a* may transmit a request for the base station 105-*a* to use repetition in transmission of, for instance, DCI scheduling the second random access message 220. For example, the UE 115-*a* may include the request as part of the preamble transmitted in the first random access message 215. Upon receiving the first random access message 215, the base station 105-*a* may transmit one or more repetitions of DCI via PDCCH 225, where the DCI schedules the PDSCH 230 of the second random access message 220. Though three repetitions of DCI are shown, any number of repetitions (in some cases, one repetition) may be transmitted consistent with the techniques described herein.

In some cases, the request for repetition may be explicitly indicated by the UE 115-*a*, while in other cases, the request for repetition may implicitly indicated. For example, the UE 115-*a* may be configured with a specific preamble associated with an indication of a request for repetition. If the first random access message 215 includes the specific preamble, the base station 105-*a* may transmit the DCI of the second random access message 220 using repetition. Additionally, or alternatively, a random access occasion, a transmission technique (e.g., a PRACH transmission technique), a preamble format, and/or a quantity of repetitions of the preamble may be configured to be associated with the use of repetition in transmitting the DCI. That is, the UE 115-*a* may implicitly indicate a request for repetition of the DCI by transmitting a preamble in the first random access message 215 in accordance with the transmission technique, the quantity of repetitions, the format, or the random access occasion. The base station 105-*a* may transmit one or more repetitions of the DCI based on the implicit indication.

The base station 105-*a* may transmit the control signaling 210 that identifies a configuration for the first random access message 215 including the preamble. For instance, the base station 105-*a* may transmit (e.g., as part of the control signaling 210) a configuration that includes an indication of a first preamble from a set of preambles, a random access occasion from a set of random access occasions, a transmission technique for the preamble from a set of transmission techniques, a format of a set of formats for the preamble, a quantity of repetitions of the preamble, or a combination thereof, that is associated with the use of repetition to transmit the DCI. The UE 115-*a* may transmit the preamble in the first random access message 215 in accordance with the configuration, such that the preamble indicates the request for the base station 105-*a* to use repetition to transmit the DCI.

Repetition of the DCI may increase reliability and efficiency of the random access procedure, for instance, by decreasing the likelihood of failure of the random access procedure and avoiding repeated random access attempts. In some scenarios, such as poor channel conditions, the probability that a given random access message is successfully received by the base station 105-*a* or the UE 115-*a* may be reduced, and the random access procedure may benefit from increased reliability. Accordingly, in some examples, the UE 115-*a* may determine to request repetition (e.g., by transmitting the preamble as part of the first random access message 215) based on one or more triggers.

As an example, the UE 115-*a* may determine to transmit the first random access message 215 including the preamble indicating the request for repetition based on determining that one or more measurement values associated with one or more thresholds are satisfied. The one or more thresholds may be configured by the base station 105-*a* and indicated to the UE 115-*a* as part of the configuration. In some cases, some measurement values may correspond to poor channel conditions or a weak signal. For instance, the UE 115-*a* may determine an RSRP value based on measuring a received synchronization signal from the base station 105-*a*; a low RSRP value may indicate that signals may be received from the base station 105-*a* with relatively low power. The UE 115-*a* may compare the RSRP value to one or more thresholds to determine a measurement value; if the measurement value associated with the one or more thresholds is satisfied, the UE 115-*a* may transmit the preamble indicating the request for repetition.

In some other examples, the one or more measurement values and/or the one or more thresholds may be associated with channel state information (CSI) measurements, e.g., the UE 115-*a* may perform one or more CSI measurements to determine the one or more measurement values and/or thresholds. In some cases, the CSI measurements may have been performed by the UE 115-*a* prior to the start of the random access procedure. For example, if the UE 115-*a* and the base station 105-*a* are performing the random access procedure after experiencing radio link failure, the UE 115-*a* may consider previously-performed CSI measurements (e.g., associated with CSI reports previously transmitted to the base station 105-*a*). The UE 115-*a* may determine that one or more previously-performed CSI measurements have large fluctuations in measurement values (e.g., over time), which may be indicative of unreliable measurements. Here, the UE 115-a may determine to request repetition based on the previously-performed CSI measurements in anticipation of decreased reliability in the random access procedure.

In some cases, the UE 115-a may modify the one or more thresholds based on the previously-performed CSI measurements. If the previously-performed CSI measurements are associated with large fluctuations, for instance, the UE 115-a may adjust the one or more thresholds to be relatively more conservative (e.g., relatively lower) to account for unreliable measurements.

Other parameters or scenarios, such as operating frequency ranges, deployment modes, subcarrier spacing, or the like, may trigger the UE 115-a to indicate the request for repetition via the preamble. For example, the UE 115-a may request repetition if the UE 115-a is operating in a stand-alone mode, but may refrain from requesting repetition if the UE 115-a utilizes dual connectivity. Additionally, or alternatively, the UE 115-a may request repetition when operating in certain frequency ranges; FR2, for example, may be associated with a shorter symbol duration and/or relatively lower transmit power. In some examples, the UE 115-a may request repetition based on a combination of parameters or scenarios. For instance, the UE 115-a may utilize dual connectivity and may communicate with the base station 105-a on a first communication link associated with a first frequency range (e.g., FR1) and a second communication link associated with a second frequency range (e.g., FR2). The UE 115-a may request repetition for the second communication link based on the associated second frequency range, but may refrain from requesting repetition on the first communication link.

In some examples, the request for repetition of the DCI scheduling the second random access message 220 may be included (e.g., implicitly) in a request for repetition of a third random access message of the random access procedure, which may be indicated as part of the preamble of the first random access message 215. That is, the UE 115-a may indicate, in the preamble, a request for the UE 115-a to use repetition to transmit the third random access message, and inclusion of this request in the preamble may implicitly indicate a request for the base station 105-a to use repetition to transmit the DCI scheduling the second random access message 220. Based on the request, the base station 105-a may transmit one or more repetitions of the DCI scheduling the second random access message 220 and the UE 115-a may transmit one or more repetitions of a third random access message. The third random access message may be, for example, one or more data transmissions (e.g., PUSCH transmissions) or one or more additional connection establishment messages.

The base station 105-a may transmit the one or more repetitions of the DCI scheduling the second random access message 220 in accordance with one or more communications parameters, such as a beam sweeping pattern, a frequency hopping pattern, a quantity of the one or more repetitions, or a grouping of monitoring occasions. In some examples, the one or more communications parameters may be preconfigured by the base station 105-a and indicated to the UE 115-a, such that if the base station 105-a grants the request for repetition, the UE 115-a may monitor for and receive the one or more repetitions in accordance with the communications parameters. For instance, the base station 105-a may transmit control signaling (e.g., RRC signaling) to the UE 115-a that identifies the one or more communications parameters.

Transmission of the first random access message 215 including the preamble indicating the request for repetition may be based on a capability of the UE 115-a. That is, repetition may be used in a CFRA procedure only if the UE 115-a is capable of receiving repetitions. The UE 115-a may transmit, to the base station 105-a, an indication of a capability of the UE 115-a to receive one or more repetitions of the DCI that schedules the second random access message 220. In such examples, the UE 115-a may transmit the first random access message 215 including the preamble indicating the request for repetition based on the indicated capability.

In some examples, the base station 105-a may not grant the request for repetition and may only transmit a single instance of the DCI scheduling the second random access message 220. In such examples, the UE 115-a may be unaware of whether the base station 105-a grants the request and may monitor for both possible transmissions of the DCI. In some cases, a first set of resources may be associated with repetitions of the DCI, while a second set of resources may be associated with the single instance. The UE 115-a may monitor both the first set of resources and the second set of resources such that the UE 115-a receives the DCI in either case.

Figure 3:
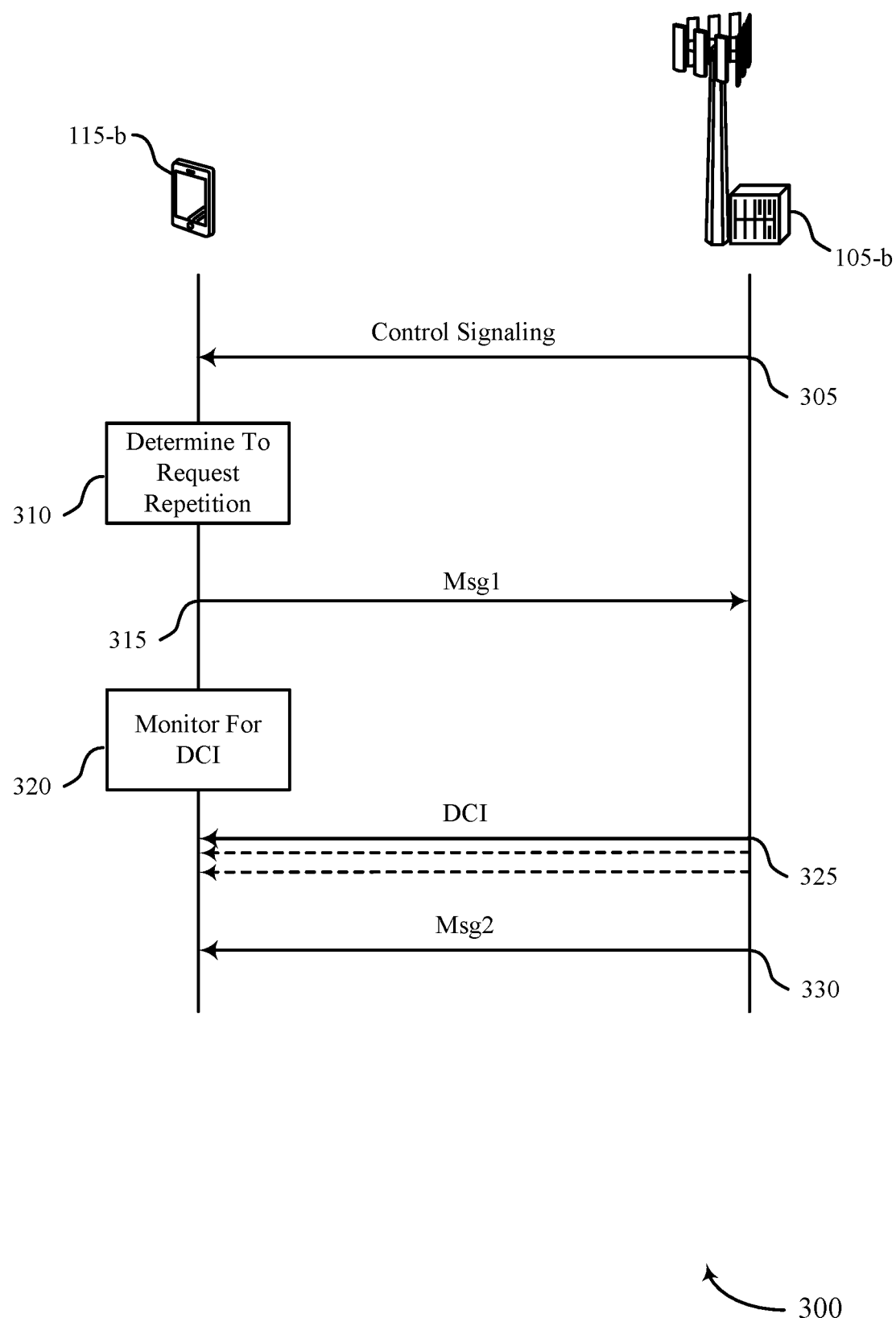
FIGS. 3 and 4 illustrate examples of process flows that support message two control channel repetition for CFRA in accordance with aspects of the present disclosure.

FIG. 3 illustrates an example of a process flow 300 that supports message two control channel repetition for CFRA in accordance with aspects of the present disclosure In some examples, the process flow 300 may implement or be implemented by aspects of wireless communications systems 100 or 200 as described herein. For example, the process flow 300 may include a UE 115-b and a base station 105-b, which may be examples of a UE 115 and a base station 105 as described with reference to FIGS. 1 and 2. Alternative examples of the following may be implemented, where some steps are performed in a different order then described or are not performed at all. In some cases, steps may include additional features not mentioned below, or further steps may be added. Additionally, while the process flow 300 illustrates the UE 115-b and the base station 105-b, any other wireless device may perform the operations shown.

The UE 115-b and the base station 105-b may perform connectivity establishment via a random access procedure. For instance, the base station 105-b may perform a connection procedure (e.g., an RRC procedure, such as a cell acquisition procedure, a random access procedure, an RRC connection procedure, an RRC configuration procedure, etc.) with the UE 115-b. In some other examples, base station 105-b and UE 115-b may perform a random access procedure to re-establish a connection after a connection failure (such as a radio-link failure) with the base station 105-b, or to establish a connection for handover to another base station, or the like. In the example of FIG. 3, the random access procedure may be a CFRA procedure.

According to the techniques described herein, the UE 115-b and the base station 105-b may utilize repetitions of DCI to increase reliability of the CFRA procedure illustrated in FIG. 3. For example, the UE 115-b may request that the base station 105-b use repetition to transmit DCI that schedules a second message (Msg2) of the CFRA procedure. Based on the request, the base station 105-b may transmit one or more repetitions of the DCI.

At 305, the base station 105-b may transmit, and the UE 115-b may receive, control signaling (e.g., RRC signaling, DCI, MAC-CE, or the like) indicating or otherwise identifying a configuration for a first message (Msg1) of the CFRA procedure, where the first message includes a preamble. As a specific example, the base station 105-*b* may transmit, and the UE 115-*b* may receive, an indication of a first preamble from a set of preambles, a random access occasion from a set of random access occasions, a transmission technique for the preamble from a set of transmission techniques, a format of a set of formats for the preamble, a quantity of repetitions of the preamble, or some combination thereof. In some cases, the configuration may include an indication of one or more thresholds.

In some examples, the control signaling may indicate a preamble assignment for the UE 115-*b*, resource allocation information for the UE 115-*b*, or the like. Additionally, or alternatively, the control signaling may identify one or more communications parameters associated with the one or more repetitions of the DCI, such as a quantity of the one or more repetitions, a grouping of monitoring occasions, a frequency hopping pattern, a beam sweeping pattern, or a combination thereof.

At 310, the UE 115-*b* may determine to request repetition of DCI that schedules the second message of the CFRA procedure based on some criteria. For instance, the UE 115-*b* may determine that repetition (i.e., coverage enhancement) may increase reliability and robustness of the CFRA procedure, e.g., based on channel conditions, a distance between the UE 115-*b* and the base station 105-*b*, a radio link failure, or the like. In some examples, the UE 115-*b* may determine to request repetition based on determining that one or more measurement values, such as one or more CSI measurement values, associated with one or more thresholds are satisfied. In some examples, the one or more measurement values, the one or more thresholds, or both, may be based on CSI measurements previously performed by the UE 115-*b* (e.g., before initiation of the CFRA procedure illustrated in FIG. 3), such as CSI measurements associated with a CSI report previously transmitted to the base station 105-*b*.

For instance, the UE 115-*b* may measure a synchronization signal received from the base station 105-*b* and may determine an RSRP value based on the measuring. The UE 115-*b* may compare the RSRP value with the one or more thresholds to determine the measurement value. If the measurement value satisfies the one or more thresholds, the UE 115-*b* may determine to request repetition. For example, a low RSRP value may be indicative of poor channel conditions, which may be associated with a low likelihood that messages in the CFRA procedure may be successfully received and decoded; accordingly, the UE 115-*b* may consider a low RSRP value as a trigger for determining to request repetition.

In some cases, the UE 115-*b* may determine to request repetition based on one or more of a frequency range, a subcarrier spacing, a deployment mode, or a combination thereof. For example, some deployment modes may be associated with repetitions of DCI scheduling the second message, and the UE 115-*b* may request repetition if operating in one such deployment mode. As another example, due to shorter symbol lengths associated with some frequency ranges (e.g., FR2), the UE 115-*b* may request repetition when operating in such frequency ranges (e.g., and may refrain from requesting repetition when operating in other frequency ranges). Additionally, or alternatively, the UE 115-*b* may determine to request repetition based on a capability of the UE 115-*b* to receive the one or more repetitions of the DCI. In such examples, the UE 115-*b* may optionally transmit an indication of the capability of the UE 115-*b* to the base station 105-*b*.

At 315, based on determining to request repetition, the UE 115-*b* may transmit, and the base station 105-*b* may receive, a first message (Msg1) including a preamble of the CFRA procedure where the preamble indicates the request for the base station 105-*b* to use repetition to transmit the DCI scheduling the second message. The UE 115-*b* may transmit the first message and the preamble in accordance with the configuration identified by the control signaling received at 305. For instance, the UE 115-*b* may transmit the first message including a preamble indicated by the configuration (e.g., associated with a preamble index or other preamble identifier indicated by the configuration). The UE 115-*b* may transmit the preamble using a preamble format and/or a transmission technique indicated by the configuration. In some examples, the UE 115-*b* may transmit one or more repetitions of the preamble as indicated by the configuration.

In some cases, the preamble may include an indication that the UE 115-*b* may transmit a third message of the CFRA procedure using repetition, and this indication may implicitly indicate the request for the base station 105-*b* to use repetition to transmit the DCI.

At 320, based on transmitting the first message including the request for the base station 105-*b* to use repetition, the UE 115-*b* may monitor for the DCI (e.g., during a random access window). The UE 115-*b* may monitor a first set of resources for the one or more repetitions of the DCI and a second set of resources for a single instance of the DCI (e.g., without repetitions).

At 325, based on receiving the first message including the preamble at 310, the base station 105-*b* may transmit, and the UE 115-*b* may receive, one or more repetitions of the DCI, where the DCI schedules the second message. The base station 105-*b* may transmit the one or more repetitions of the DCI (e.g., scrambled using the RA-RNTI indicated in the preamble), for instance, via PDCCH. The DCI may include scheduling information for the second message, such as resource allocation information. In some cases, the base station 105-*b* may transmit the one or more repetitions based on one or more communication parameters, such as one or more preconfigured communication parameters indicated in the control signaling at 305. The one or more repetitions may be transmitted on the first set of resources monitored by the UE 115-*b* at 320 (e.g., the UE 115-*b* may receive the one or more repetitions based on the monitoring performed at 320).

At 330, based on successfully decoding the DCI, the base station 105-*b* may transmit, and the UE 115-*b* may receive, the second message. The second message may include or may be an example of a random access response. In some examples, the second message may be transmitted via PDSCH and may include timing alignment information, an uplink grant, a preamble identifier (e.g., RAPID), or the like. The UE 115-*b* may consider the CFRA procedure complete based on successfully decoding the second message, such that the UE 115-*b* and the base station 105-*b* may have an established communication connection.

Figure 4:
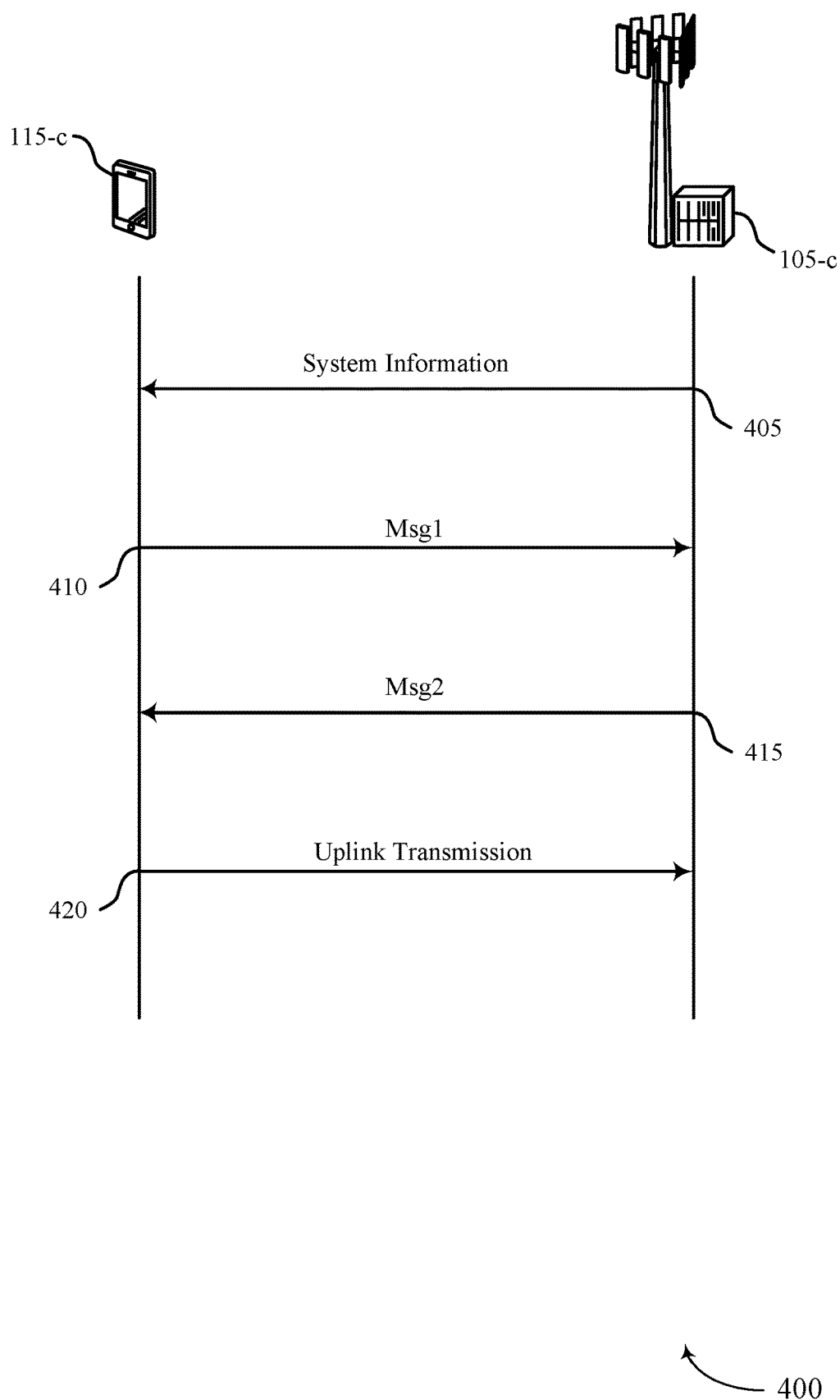

FIG. 4 illustrates an example of a process flow 400 that supports message two control channel repetition for CFRA in accordance with aspects of the present disclosure. In some examples, the process flow 400 may implement or be implemented by aspects of wireless communications systems 100 or 200 as described herein. For example, the process flow 400 may include a UE 115-*c* and a base station 105-*c*, which may be examples of a UE 115 and a base station 105 as described with reference to FIGS. 1-3. Alternative examples of the following may be implemented, where some steps are performed in a different order then described or are not performed at all. In some cases, steps may include additional features not mentioned below, or further steps may be added. Additionally, while the process flow 400 illustrates the UE 115-c and the base station 105-c, any other wireless device may perform the operations shown.

The UE 115-c and the base station 105-c may perform connectivity establishment via a random access procedure. For instance, the base station 105-c may perform a connection procedure (e.g., an RRC procedure, such as a cell acquisition procedure, a random access procedure, an RRC connection procedure, an RRC configuration procedure, etc.) with the UE 115-c. In some other examples, base station 105-c and UE 115-c may perform a random access procedure to re-establish a connection after a connection failure (such as a radio-link failure) with the base station 105-c, or to establish a connection for handover to another base station, or the like. In the example of FIG. 4, the random access procedure may be a CFRA procedure.

At 405, the base station 105-c may transmit, and the UE 115-c may receive, system information, such as configuration information associated with the CFRA procedure. The system information may include resource allocation information for the UE 115-c, a random access preamble assignment for the UE 115-c to use in the CFRA procedure, communication parameters (e.g., a frequency hopping pattern, abeam sweeping pattern, a quantity of repetitions, a grouping of monitoring occasions, etc.), sequence generation parameters, and other examples. For instance, the base station 105-c may transmit control signaling to the UE 115-c indicating or otherwise identifying a configuration for a first message (Msg1) of the CFRA procedure, where the first message includes a preamble. As a specific example, the base station 105-c may transmit, and the UE 115-c may receive, an indication of a first preamble from a set of preambles, a random access occasion from a set of random access occasions, a transmission technique for the preamble from a set of transmission techniques, a format of a set of formats for the preamble, a quantity of repetitions associated with the preamble, or some combination thereof. In some examples, the system information may be transmitted via RRC signaling, DCI (e.g., via PDCCH), or the like.

At 410, the UE 115-c may transmit, and the base station 105-c may receive, a first message (Msg1) including a preamble of the CFRA procedure; the UE 115-c may transmit the first message and the preamble in accordance with the system information received at 405. For instance, the UE 115-c may transmit the first message including the preamble on time and frequency resources indicated in the system information. In some examples, the UE 115-c may transmit the first message on a PRACH. The preamble may carry information, such as a UE identifier (e.g., RA-RNTI) associated with the UE 115-c, and may be associated with a sequence (e.g., a contention-free preamble sequence).

The preamble of the first message may indicate a request for the base station 105-c to use repetition in a subsequent transmission of DCI. For instance, the UE 115-a may transmit the first message including the preamble and indicating the request for the base station 105-c to use repetition to transmit DCI that schedules a second message of the CFRA procedure (e.g., as illustrated at 415). In some cases, the preamble may include an indication that the UE 115-c may transmit a third message of the CFRA procedure using repetition, and this indication may implicitly indicate the request for the base station 105-c to use repetition to transmit the DCI. In some examples, the UE 115-c may transmit the first message indicating the request based on determining that one or more measurement values, such as one or more CSI measurement values, associated with one or more thresholds are satisfied. In some examples, the one or more measurement values, the one or more thresholds, or both, may be based on CSI measurements previously performed by the UE 115-c (e.g., before initiation of the CFRA procedure illustrated in FIG. 4).

For instance, the UE 115-c may measure a synchronization signal received from the base station 105-c and may determine an RSRP value based on the measuring. The UE 115-c may compare the RSRP value with the one or more thresholds to determine the measurement value. If the measurement value satisfies the one or more thresholds, the UE 115-c may transmit the first message indicating the request. In some cases, the UE 115-c may receive an indication of the one or more thresholds from the base station 105-c, e.g., as part of the configuration.

In some cases, the UE 115-c may transmit the first message including the preamble based on the received configuration and one or more of a frequency range, a subcarrier spacing, a deployment mode, or a combination thereof. Additionally, or alternatively, the UE 115-c may transmit the first message including the preamble based on a capability of the UE 115-c to receive one or more repetitions of the DCI. In such examples, the UE 115-c may optionally transmit an indication of the capability of the UE 115-c to the base station 105-c.

At 415, based on receiving the first message including the preamble at 410, the base station 105-c may transmit, to the UE 115-c, a second message (Msg2) of the CFRA procedure. The base station 105-c may initially transmit DCI (e.g., scrambled using the RA-RNTI indicated in the preamble), for instance, via PDCCH, that includes scheduling information for the second message. The base station 105-c may transmit the DCI during a random access window (e.g., a random aces response window). The UE 115-c may monitor for the DCI during the random access window, for instance, by attempting to detect a DCI associated with a DCI format (e.g., DCI format 1_0) and having a cyclic redundancy check scrambled with the RA-RNTI. According to the techniques described herein, the base station 105-c may transmit, to the UE 115-c, one or more repetitions of the DCI scheduling the second message. For example, the base station 105-c may transmit one or more repetitions of the DCI based on receiving (e.g., at 410) the first message including the preamble and indicating a request for repetition. In some cases, the base station 105-c may transmit the one or more repetitions based on one or more communication parameters, such as one or more preconfigured communication parameters indicated in the system information at 405.

Based on successfully decoding the DCI, the UE 115-c may receive and decode the second message. The second message may include or may be an example of a random access response. In some examples, the second message may be transmitted via PDSCH and may include timing alignment information, an uplink grant, a preamble identifier (e.g., RAPID), or the like. The UE 115-c may consider the CFRA procedure complete based on successfully decoding the second message, such that the UE 115-c and the base station 105-c may have an established communication connection.

At 420, based on the successful CFRA procedure, the UE 115-c may transmit an uplink transmission (e.g., via PUSCH) to the base station 105-c. In some examples, the UE 115-c may transmit the uplink transmission in accordance with information received (e.g., at 420) in the second message, such as an uplink grant or timing alignment information. In some cases, the uplink transmission may be referred to as a third message (Msg3) of the random access procedure.

Figure 5:
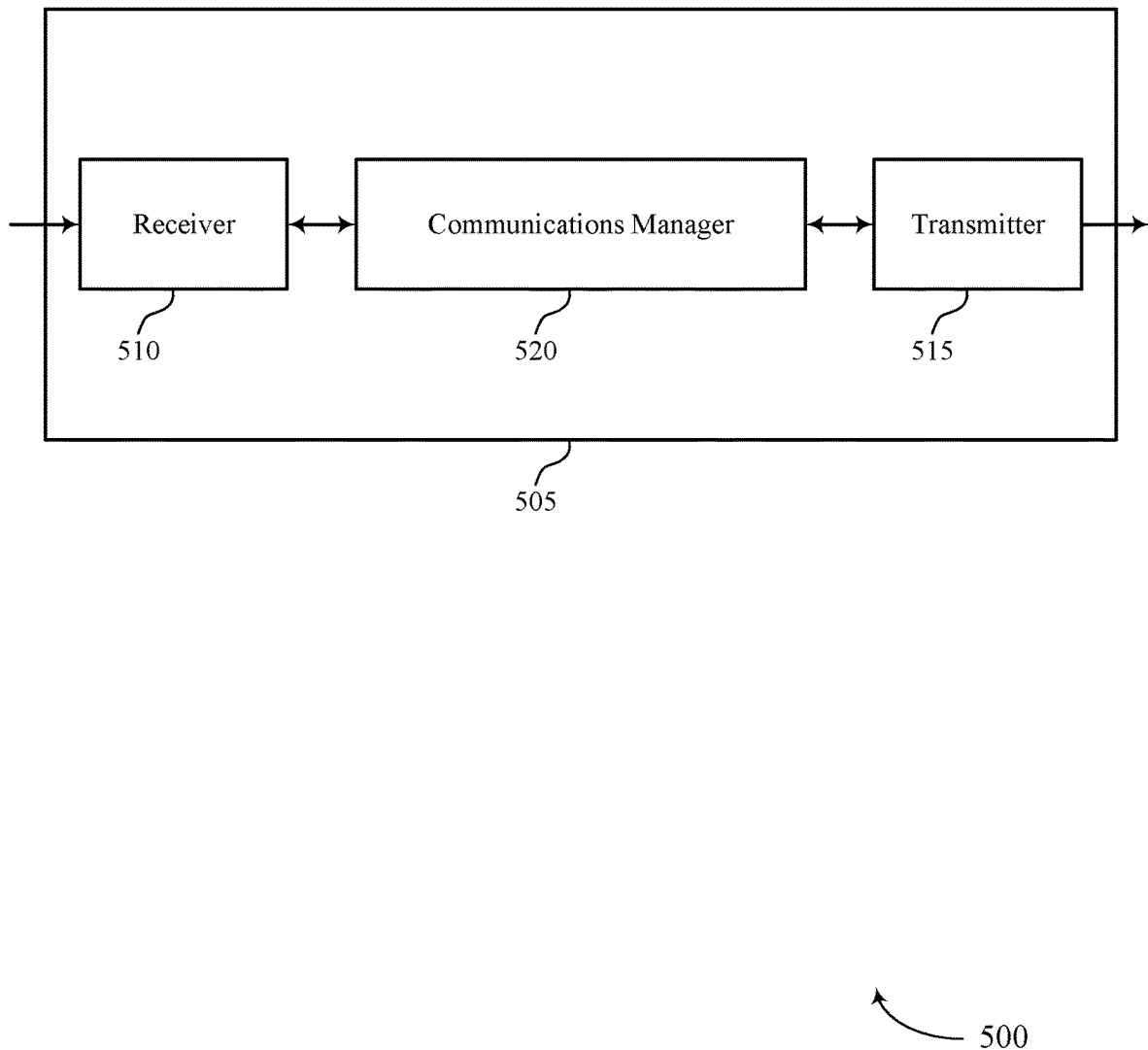
FIGS. 5 and 6 show block diagrams of devices that support message two control channel repetition for CFRA in accordance with aspects of the present disclosure.

FIG. 5 shows a block diagram 500 of a device 505 that supports message two control channel repetition for CFRA in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to message two control channel repetition for CFRA). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to message two control channel repetition for CFRA). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of message two control channel repetition for CFRA as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving control signaling identifying a configuration for a first message of a CFRA procedure, the first message including a preamble. The communications manager 520 may be configured as or otherwise support a means for transmitting the first message according to the configuration, where the preamble of the first message indicates a request for the base station to use repetition to transmit DCI that schedules a second message of the CFRA procedure. The communications manager 520 may be configured as or otherwise support a means for receiving one or more repetitions of the DCI in response to the request. The communications manager 520 may be configured as or otherwise support a means for receiving the second message of the CFRA procedure based on the received one or more repetitions of the DCI.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for increasing reliability of random access procedures. For instance, the device 505 may determine to request repetition of DCI scheduling a second message of a random access procedure based on one or more parameters or operating scenarios. Repetition may increase the likelihood that the random access procedure is successful, which may enable the device 505 to avoid repeated random access attempts. As such, the device 505 may potentially communicate with a base station to establish a connection more successfully, which may decrease a number of potential retransmissions or a number of monitoring occasions that the device 505 may decode. Accordingly, the device 505 may power off one or more processing units associated with transmitting or decoding monitoring occasions, which may improve power savings at the device 505 and increase battery life.

Figure 6:
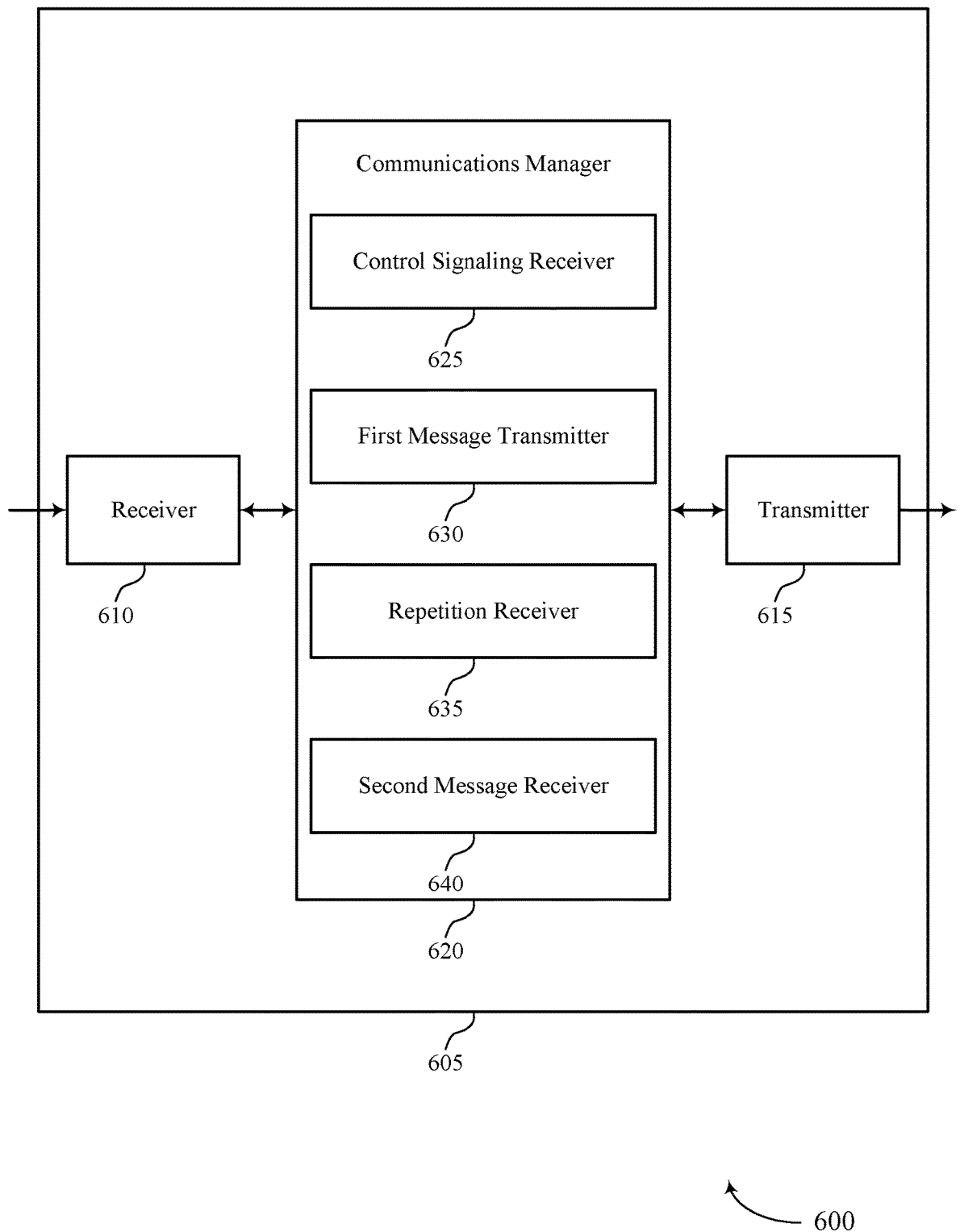

FIG. 6 shows a block diagram 600 of a device 605 that supports message two control channel repetition for CFRA in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to message two control channel repetition for CFRA). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to message two control channel repetition for CFRA). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of message two control channel repetition for CFRA as described herein. For example, the communications manager 620 may include a control signaling receiver 625, a first message transmitter 630, a repetition receiver 635, a second message receiver 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The control signaling receiver 625 may be configured as or otherwise support a means for receiving control signaling identifying a configuration for a first message of a CFRA procedure, the first message including a preamble. The first message transmitter 630 may be configured as or otherwise support a means for transmitting the first message according to the configuration, where the preamble of the first message indicates a request for the base station to use repetition to transmit DCI that schedules a second message of the CFRA procedure. The repetition receiver 635 may be configured as or otherwise support a means for receiving one or more repetitions of the DCI in response to the request. The second message receiver 640 may be configured as or otherwise support a means for receiving the second message of the CFRA procedure based on the received one or more repetitions of the DCI.

Figure 7:
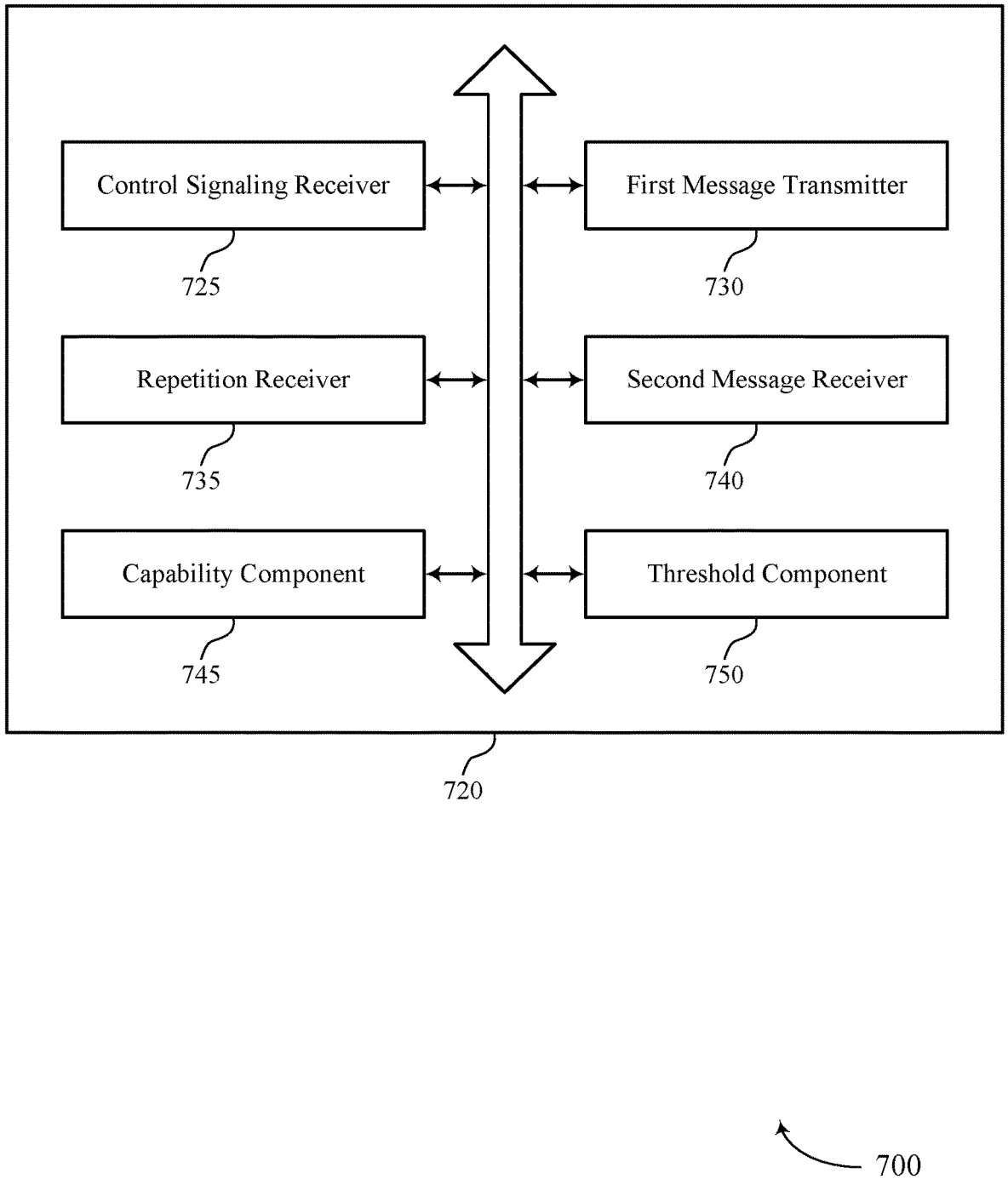
FIG. 7 shows a block diagram of a communications manager that supports message two control channel repetition for CFRA in accordance with aspects of the present disclosure.

FIG. 7 shows a block diagram 700 of a communications manager 720 that supports message two control channel repetition for CFRA in accordance with aspects of the present disclosure. The communications manager 720 may be an example of aspects of a communications manager 520, a communications manager 620, or both, as described herein. The communications manager 720, or various components thereof, may be an example of means for performing various aspects of message two control channel repetition for CFRA as described herein. For example, the communications manager 720 may include a control signaling receiver 725, a first message transmitter 730, a repetition receiver 735, a second message receiver 740, a capability component 745, a threshold component 750, or any combination thereof. Each of these components may communicate, directly or indirectly, with one another (e.g., via one or more buses).

The communications manager 720 may support wireless communications at a UE in accordance with examples as disclosed herein. The control signaling receiver 725 may be configured as or otherwise support a means for receiving control signaling identifying a configuration for a first message of a CFRA procedure, the first message including a preamble. The first message transmitter 730 may be configured as or otherwise support a means for transmitting the first message according to the configuration, where the preamble of the first message indicates a request for the base station to use repetition to transmit DCI that schedules a second message of the CFRA procedure. The repetition receiver 735 may be configured as or otherwise support a means for receiving one or more repetitions of the DCI in response to the request. The second message receiver 740 may be configured as or otherwise support a means for receiving the second message of the CFRA procedure based on the received one or more repetitions of the DCI.

In some examples, to support receiving the control signaling identifying the configuration for the first message, the control signaling receiver 725 may be configured as or otherwise support a means for receiving an indication of a first preamble from a set of preambles, a random access occasion from a set of random access occasions, a transmission technique for the preamble from a set of transmission techniques, a format of a set of formats for the preamble, a quantity of repetitions of the preamble, or any combination thereof, that is associated with the use of repetition to transmit the DCI that schedules the second message.

In some examples, to support transmitting the first message based on the configuration, the first message transmitter 730 may be configured as or otherwise support a means for transmitting the first message indicating the request based on determining that one or more measurement values associated with one or more thresholds are satisfied.

In some examples, the threshold component 750 may be configured as or otherwise support a means for determining a reference signal received power value based on a measurement value of a synchronization signal received from the base station. In some examples, the threshold component 750 may be configured as or otherwise support a means for comparing the reference signal received power value with the one or more thresholds to determine the measurement value.

In some examples, the one or more measurement values, the one or more thresholds, or both are based on one or more channel state information measurements performed before a start of the CFRA procedure.

In some examples, the configuration includes an indication of the one or more thresholds.

In some examples, the repetition receiver 735 may be configured as or otherwise support a means for receiving control signaling identifying one or more communications parameters associated with the one or more repetitions of the DCI, where receiving the one or more repetitions of the DCI is based on the one or more communications parameters.

In some examples, the one or more communications parameters include a frequency hopping pattern, a beam sweeping pattern, a quantity of the one or more repetitions, a grouping of monitoring occasions, or any combination thereof.

In some examples, to support transmitting the first message, the first message transmitter 730 may be configured as or otherwise support a means for transmitting the first message based on the configuration and one or more of a frequency range, a subcarrier spacing, a deployment mode, or any combination thereof.

In some examples, the capability component 745 may be configured as or otherwise support a means for transmitting an indication of a capability of the UE to receive the one or more repetitions of the DCI that schedules the second message of the CFRA procedure, where transmitting the first message indicating the request is based on the capability.

In some examples, the repetition receiver 735 may be configured as or otherwise support a means for monitoring, after transmitting the request for the base station to use repetition to transmit the DCI, both a first set of resources for the one or more repetitions of the DCI and a second set of resources for a single instance of the DCI, the one or more repetitions of the DCI received based on the monitoring.

In some examples, to support transmitting the first message, the first message transmitter 730 may be configured as or otherwise support a means for transmitting the first message, where the preamble of the includes first message an indication for the UE to transmit, to the base station, a third message of the CFRA procedure using repetition, where the indication for the UE to transmit the third message using repetition indicates the request for the base station to use repetition to transmit the DCI that schedules the second message.

Figure 8:
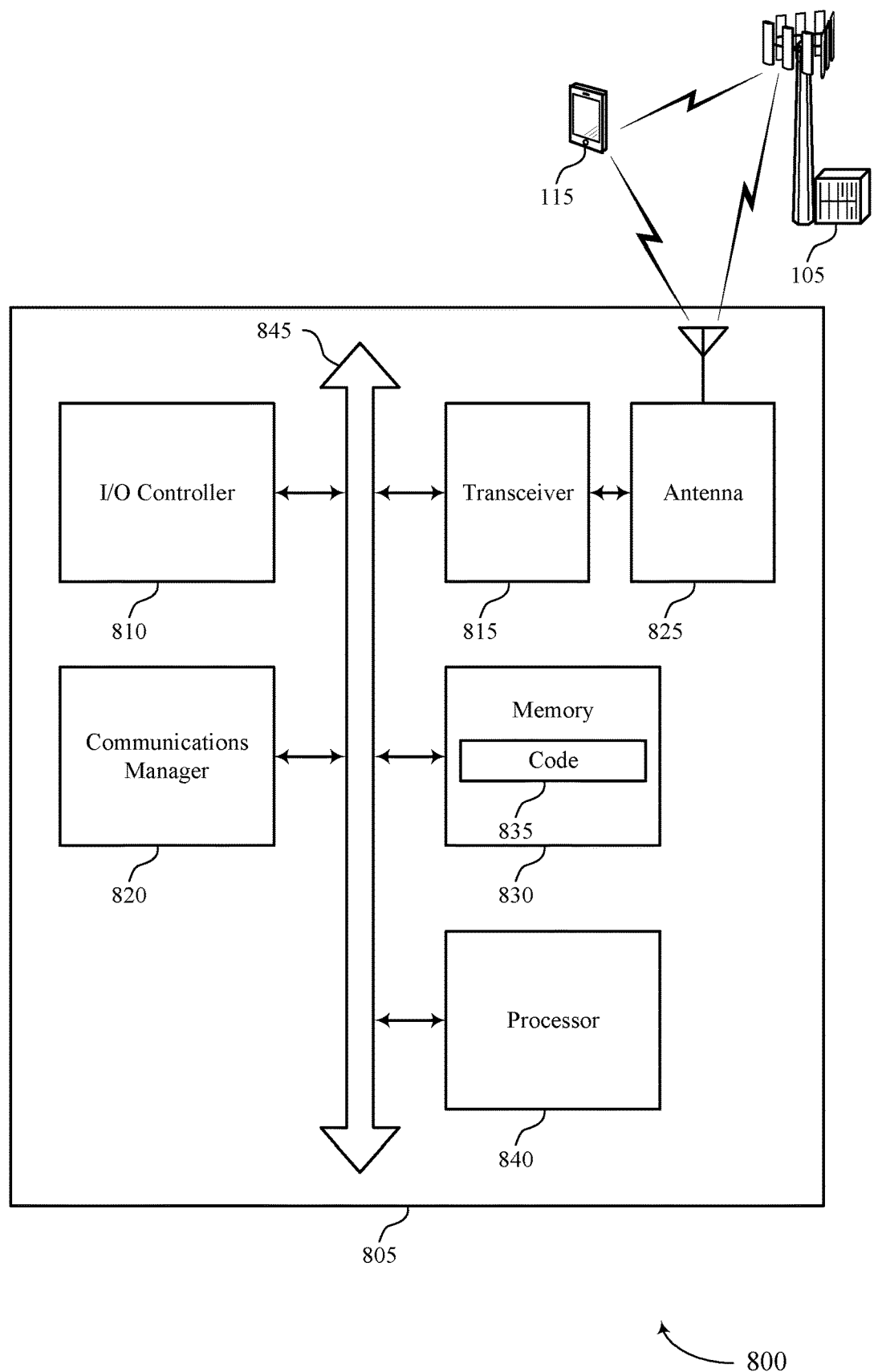
FIG. 8 shows a diagram of a system including a device that supports message two control channel repetition for CFRA in accordance with aspects of the present disclosure.

FIG. 8 shows a diagram of a system 800 including a device 805 that supports message two control channel repetition for CFRA in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting message two control channel repetition for CFRA). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving control signaling identifying a configuration for a first message of a CFRA procedure, the first message including a preamble. The communications manager 820 may be configured as or otherwise support a means for transmitting the first message according to the configuration, where the preamble of the first message indicates a request for the base station to use repetition to transmit DCI that schedules a second message of the CFRA procedure. The communications manager 820 may be configured as or otherwise support a means for receiving one or more repetitions of the DCI in response to the request. The communications manager 820 may be configured as or otherwise support a means for receiving the second message of the CFRA procedure based on the received one or more repetitions of the DCI.

By including or configuring the communications manager 820 in accordance with examples as described herein, the device 805 may support techniques for increasing reliability of random access procedures. For instance, the device 805 may determine to request repetition of DCI scheduling a second message of a random access procedure based on one or more parameters or operating scenarios. Repetition may increase the likelihood that the random access procedure is successful, which may enable the device 805 to avoid repeated random access attempts. As such, the device 805 may complete a random access procedure more quickly and efficiently, which may reduce delays introduced by failed random access attempts and improve overall system latency.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of message two control channel repetition for CFRA as described herein, or the processor 840 and the memory 830 may be otherwise configured to perform or support such operations.

Figure 9:
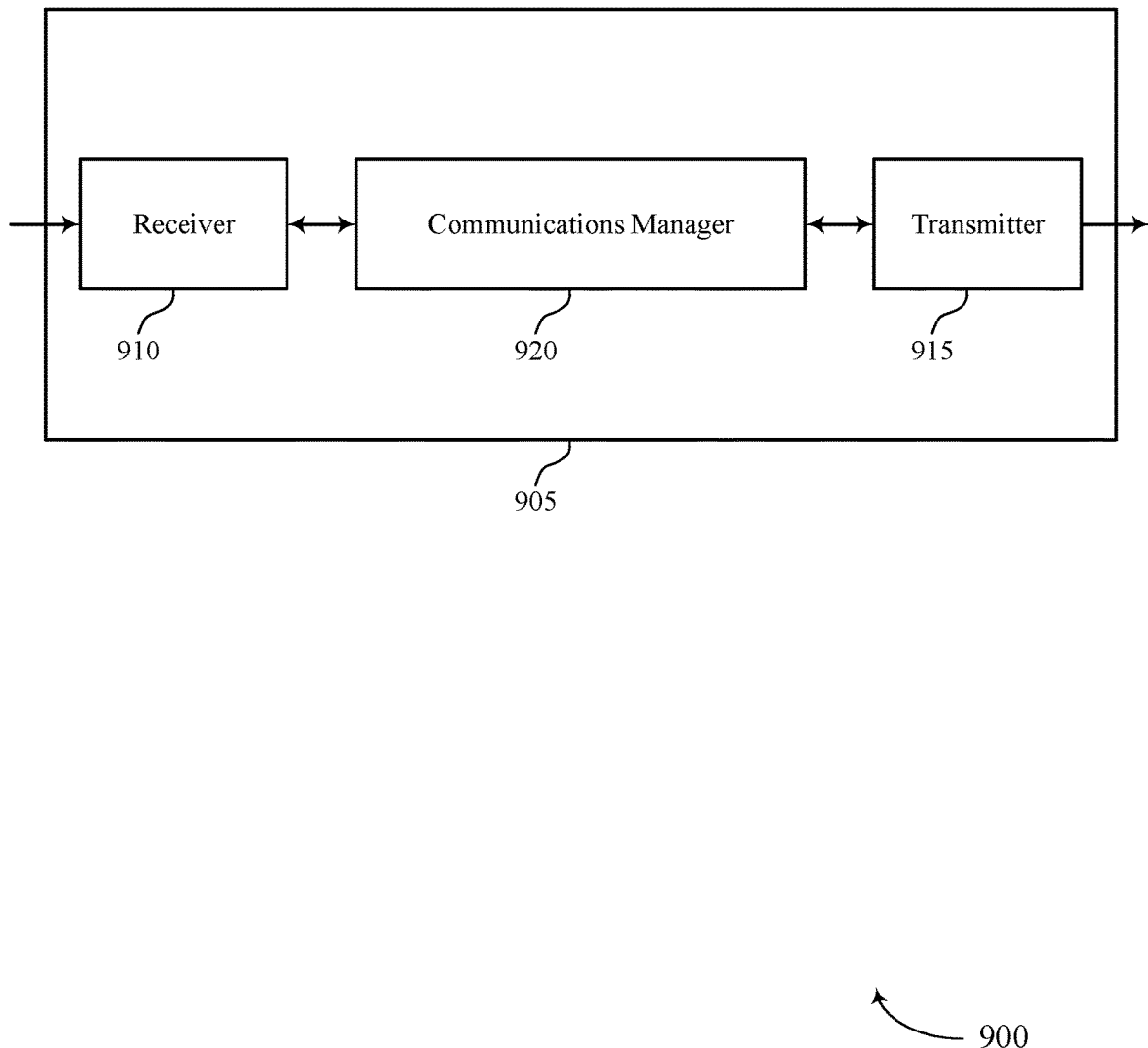
FIGS. 9 and 10 show block diagrams of devices that support message two control channel repetition for CFRA in accordance with aspects of the present disclosure.

FIG. 9 shows a block diagram 900 of a device 905 that supports message two control channel repetition for CFRA in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to message two control channel repetition for CFRA). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to message two control channel repetition for CFRA). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of message two control channel repetition for CFRA as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure.

In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for transmitting, to a UE, control signaling identifying a configuration for a first message of a CFRA procedure, the first message including a preamble. The communications manager 920 may be configured as or otherwise support a means for receiving the first message according to the configuration, where the preamble of the first message indicates a request for the base station to use repetition to transmit DCI that schedules a second message of the CFRA procedure. The communications manager 920 may be configured as or otherwise support a means for transmitting one or more repetitions of the DCI in response to the request. The communications manager 920 may be configured as or otherwise support a means for transmitting the second message of the CFRA procedure according to the transmitted DCI.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for increasing reliability of random access procedures. For instance, by transmitting one or more repetitions of DCI that schedules a second message of a random access procedure, the device 905 may increase the likelihood that the second message and the DCI is received, which may likewise increase the likelihood that the random access procedure is successful. As such, the device 905 may avoid potential retransmissions of random access messages, which may in turn reduce power consumption at the device 905.

Figure 10:
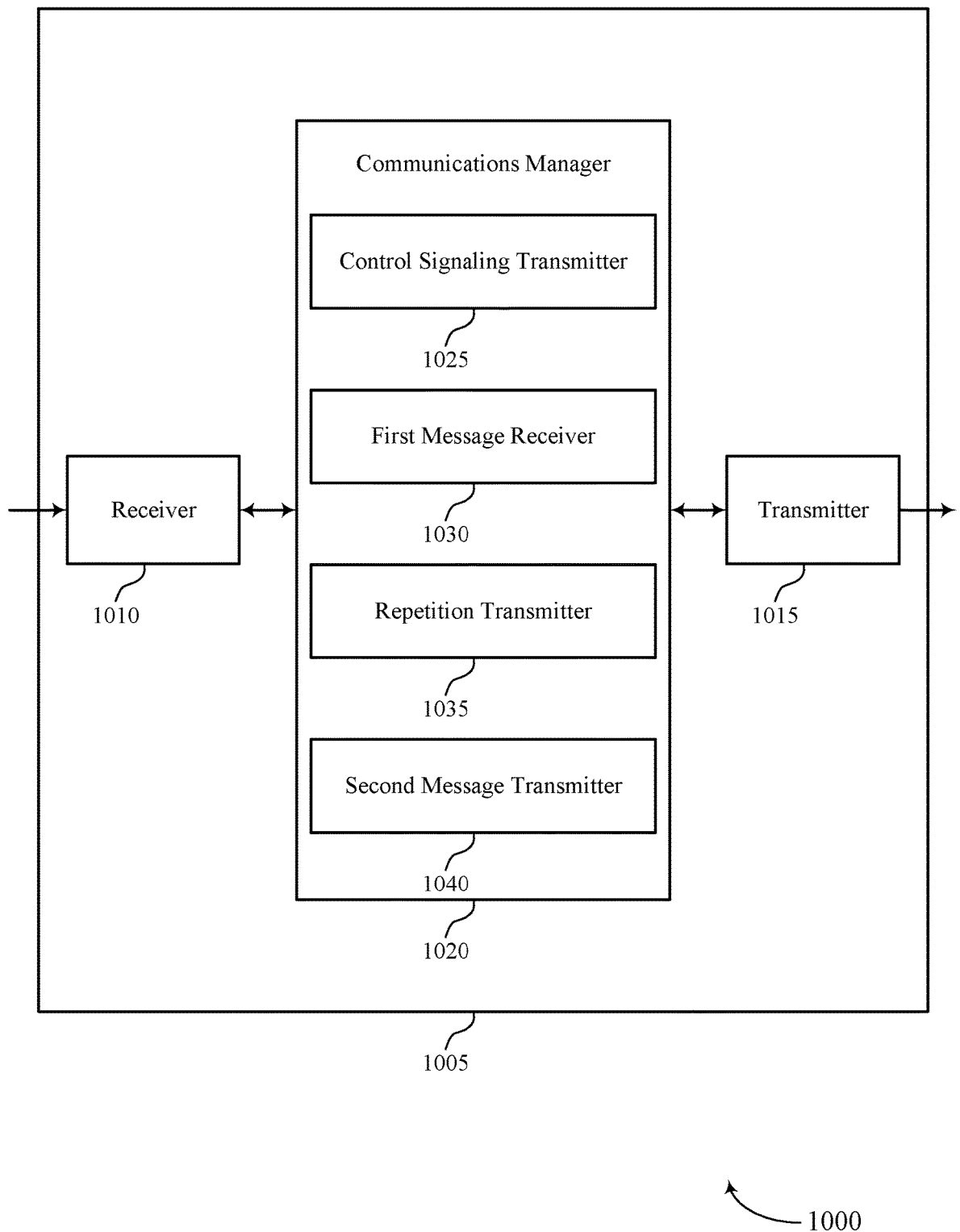

FIG. 10 shows a block diagram 1000 of a device 1005 that supports message two control channel repetition for CFRA in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to message two control channel repetition for CFRA). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to message two control channel repetition for CFRA). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of message two control channel repetition for CFRA as described herein. For example, the communications manager 1020 may include a control signaling transmitter 1025, a first message receiver 1030, a repetition transmitter 1035, a second message transmitter 1040, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The control signaling transmitter 1025 may be configured as or otherwise support a means for transmitting, to a UE, control signaling identifying a configuration for a first message of a CFRA procedure, the first message including a preamble. The first message receiver 1030 may be configured as or otherwise support a means for receiving the first message according to the configuration, where the preamble of the first message indicates a request for the base station to use repetition to transmit DCI that schedules a second message of the CFRA procedure. The repetition transmitter 1035 may be configured as or otherwise support a means for transmitting one or more repetitions of the DCI in response to the request. The second message transmitter 1040 may be configured as or otherwise support a means for transmitting the second message of the CFRA procedure according to the transmitted DCI.

Figure 11:
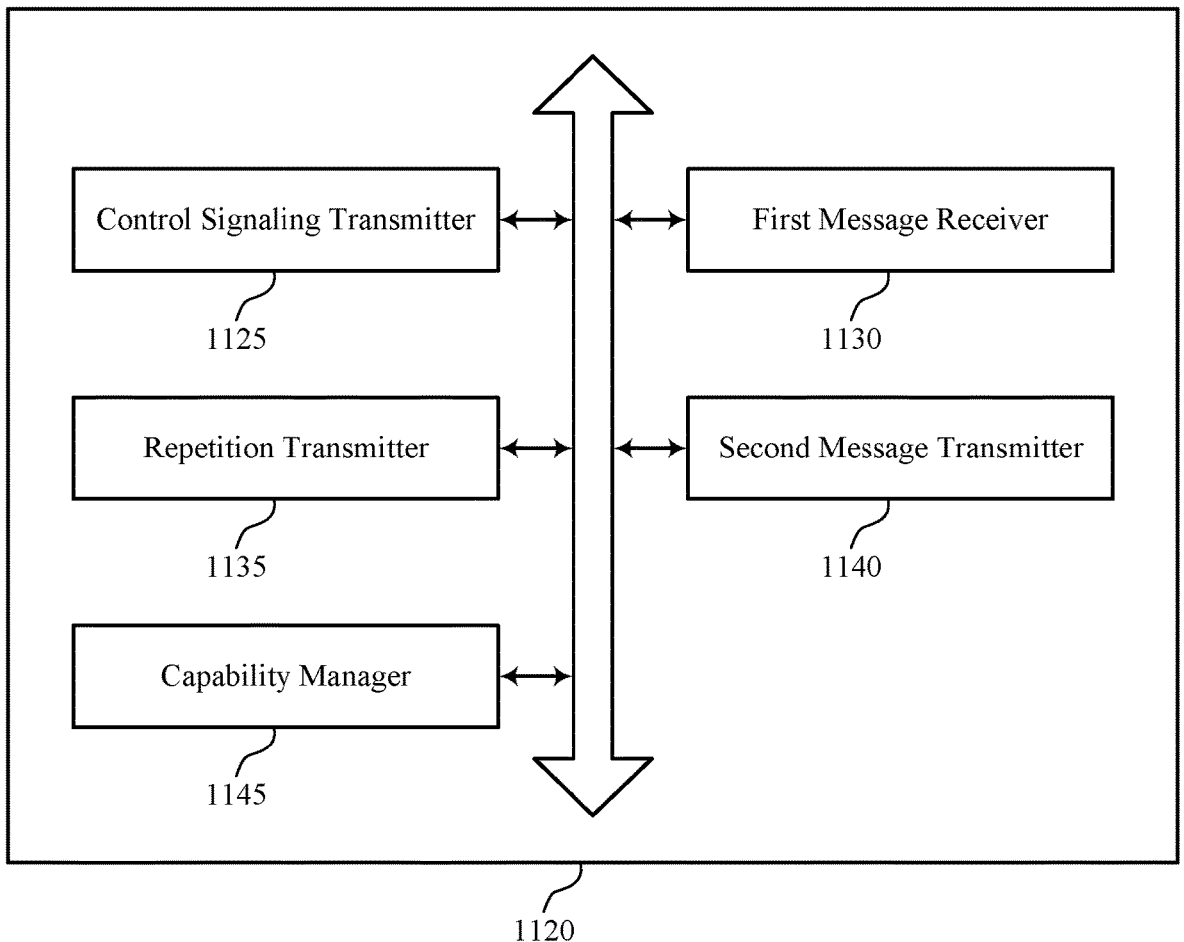
FIG. 11 shows a block diagram of a communications manager that supports message two control channel repetition for CFRA in accordance with aspects of the present disclosure.

FIG. 11 shows a block diagram 1100 of a communications manager 1120 that supports message two control channel repetition for CFRA in accordance with aspects of the present disclosure. The communications manager 1120 may be an example of aspects of a communications manager 920, a communications manager 1020, or both, as described herein. The communications manager 1120, or various components thereof, may be an example of means for performing various aspects of message two control channel repetition for CFRA as described herein. For example, the communications manager 1120 may include a control signaling transmitter 1125, a first message receiver 1130, a repetition transmitter 1135, a second message transmitter 1140, a capability manager 1145, or any combination thereof. Each of these components may communicate, directly or indirectly, with one another (e.g., via one or more buses).

The communications manager 1120 may support wireless communications at a base station in accordance with examples as disclosed herein. The control signaling transmitter 1125 may be configured as or otherwise support a means for transmitting, to a UE, control signaling identifying a configuration for a first message of a CFRA procedure, the first message including a preamble. The first message receiver 1130 may be configured as or otherwise support a means for receiving the first message according to the configuration, where the preamble of the first message indicates a request for the base station to use repetition to transmit DCI that schedules a second message of the CFRA procedure. The repetition transmitter 1135 may be configured as or otherwise support a means for transmitting one or more repetitions of the DCI in response to the request. The second message transmitter 1140 may be configured as or otherwise support a means for transmitting the second message of the CFRA procedure according to the transmitted DCI.

In some examples, to support transmitting the control signaling identifying the configuration for the first message, the control signaling transmitter 1125 may be configured as or otherwise support a means for transmitting an indication of a first preamble from a set of preambles, a random access occasion from a set of random access occasions, a transmission technique for the preamble from a set of transmission techniques, a format of a set of formats for the preamble, a quantity of repetitions of the preamble, or any combination thereof, that is associated with the use of repetition to transmit the DCI that schedules the second message.

In some examples, to support receiving the first message based on the configuration, the first message receiver 1130 may be configured as or otherwise support a means for receiving the first message indicating the request based on one or more measurement values associated with one or more thresholds being satisfied.

In some examples, the configuration includes an indication of the one or more thresholds.

In some examples, the control signaling transmitter 1125 may be configured as or otherwise support a means for transmitting control signaling identifying one or more communications parameters associated with the one or more repetitions of the DCI, where transmitting the one or more repetitions of the DCI is based on the one or more communications parameters.

In some examples, the one or more communications parameters include a frequency hopping pattern, a beam sweeping pattern, a quantity of the one or more repetitions, a grouping of monitoring occasions, or any combination thereof.

In some examples, to support receiving the first message, the first message receiver 1130 may be configured as or otherwise support a means for receiving the first message based on the configuration and one or more of a frequency range, a subcarrier spacing, a deployment mode, or any combination thereof.

In some examples, the capability manager 1145 may be configured as or otherwise support a means for receiving an indication of a capability of the UE to receive the one or more repetitions of the DCI that schedules the second message of the CFRA procedure.

In some examples, to support receiving the first message, the first message receiver 1130 may be configured as or otherwise support a means for receiving the first message, where the preamble of the first message includes an indication for the UE to transmit, to the base station, a third message of the CFRA procedure using repetition, where the indication for the UE to transmit the third message using repetition indicates the request for the base station to use repetition to transmit the DCI that schedules the second message.

Figure 12:
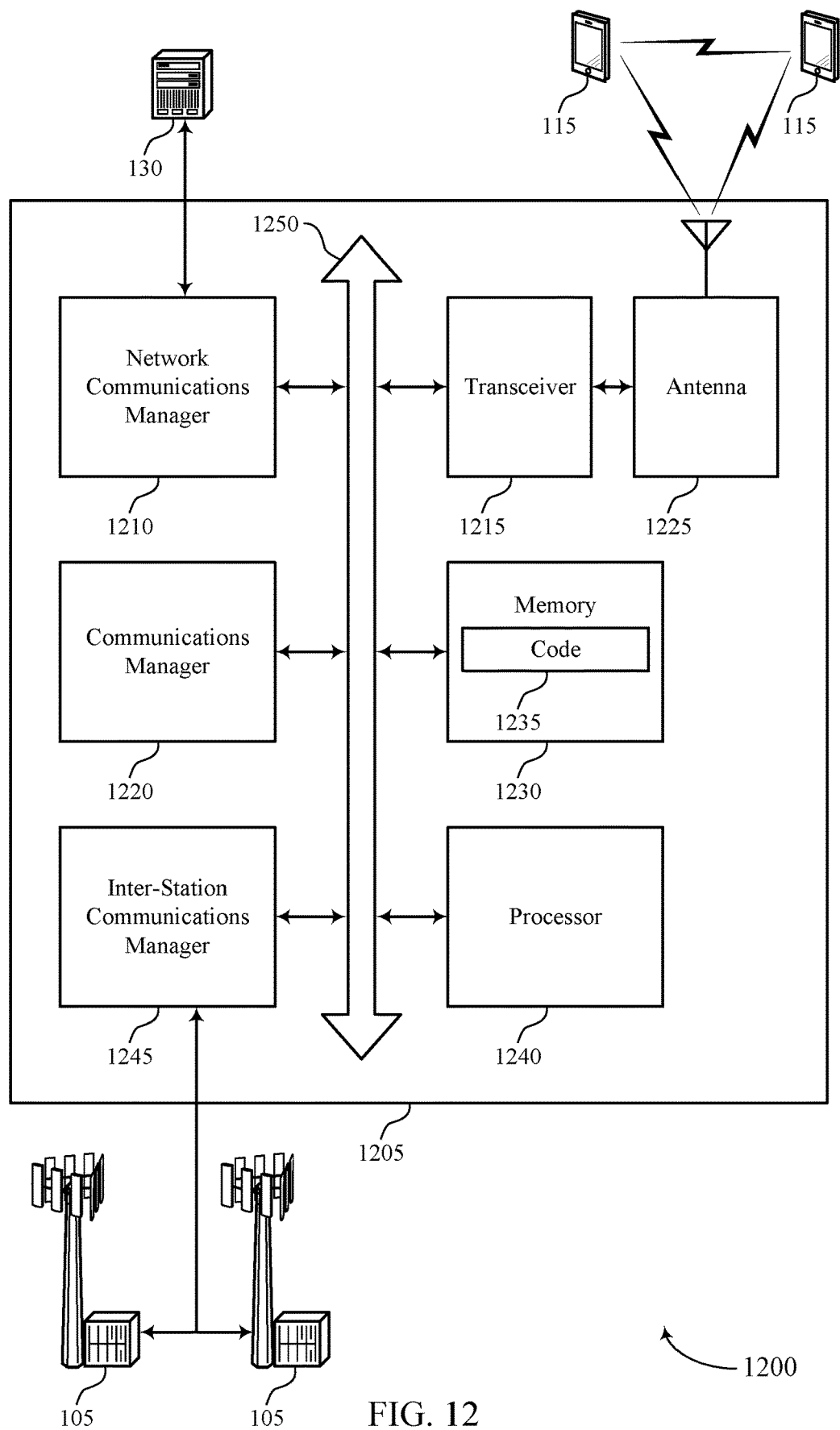
FIG. 12 shows a diagram of a system including a device that supports message two control channel repetition for CFRA in accordance with aspects of the present disclosure.

FIG. 12 shows a diagram of a system 1200 including a device 1205 that supports message two control channel repetition for CFRA in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory.

In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting message two control channel repetition for CFRA). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for transmitting, to a UE, control signaling identifying a configuration for a first message of a CFRA procedure, the first message including a preamble. The communications manager 1220 may be configured as or otherwise support a means for receiving the first message according to the configuration, where the preamble of the first message indicates a request for the base station to use repetition to transmit DCI that schedules a second message of the CFRA procedure. The communications manager 1220 may be configured as or otherwise support a means for transmitting one or more repetitions of the DCI in response to the request. The communications manager 1220 may be configured as or otherwise support a means for transmitting the second message of the CFRA procedure according to the transmitted DCI.

By including or configuring the communications manager 1220 in accordance with examples as described herein, the device 1205 may support techniques for increasing reliability of random access procedures. For instance, by transmitting one or more repetitions of DCI that schedules a second message of a random access procedure, the device 1205 may increase the likelihood that the second message and the DCI is received, which may likewise increase the likelihood that the random access procedure is successful. As such, the device 1205 may avoid delays introduced by retransmissions of random access messages and repeated random access attempts, which may reduce latency in the system and increase communications efficiency.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of message two control channel repetition for CFRA as described herein, or the processor 1240 and the memory 1230 may be otherwise configured to perform or support such operations.

Figure 13:
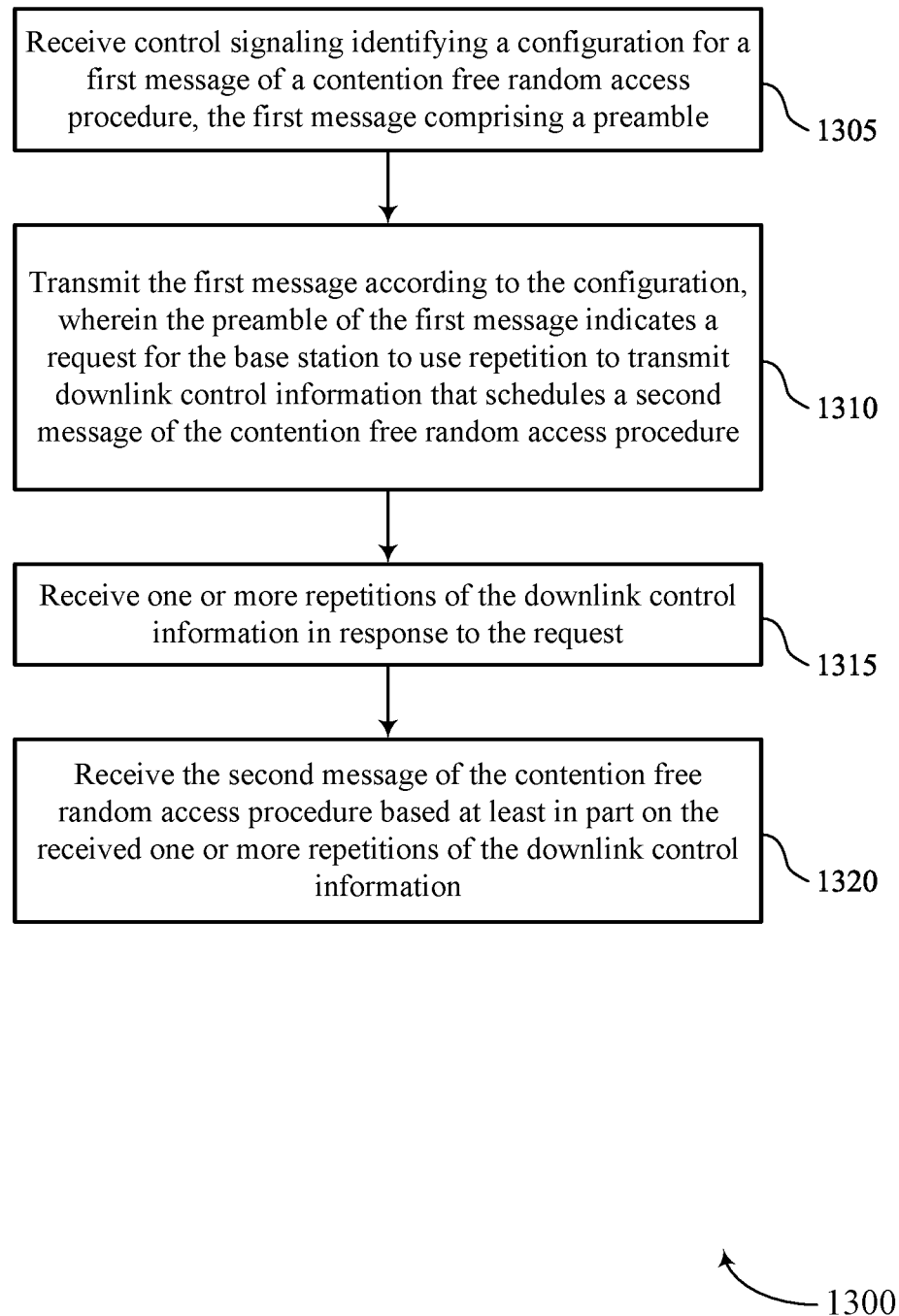
FIGS. 13 through 16 show flowcharts illustrating methods that support message two control channel repetition for CFRA in accordance with aspects of the present disclosure.

FIG. 13 shows a flowchart illustrating a method 1300 that supports message two control channel repetition for CFRA in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving control signaling identifying a configuration for a first message of a CFRA procedure, the first message including a preamble. The operations of 1305 may be performed in accordance with examples as disclosed herein. In some examples, aspects of the operations of 1305 may be performed by a control signaling receiver 725 as described with reference to FIG. 7.

At 1310, the method may include transmitting the first message according to the configuration, where the preamble of the first message indicates a request for the base station to use repetition to transmit DCI that schedules a second message of the CFRA procedure. The operations of 1310 may be performed in accordance with examples as disclosed herein. In some examples, aspects of the operations of 1310 may be performed by a first message transmitter 730 as described with reference to FIG. 7.

At 1315, the method may include receiving one or more repetitions of the DCI in response to the request. The operations of 1315 may be performed in accordance with examples as disclosed herein. In some examples, aspects of the operations of 1315 may be performed by a repetition receiver 735 as described with reference to FIG. 7.

At 1320, the method may include receiving the second message of the CFRA procedure based on the received one or more repetitions of the DCI. The operations of 1320 may be performed in accordance with examples as disclosed herein. In some examples, aspects of the operations of 1320 may be performed by a second message receiver 740 as described with reference to FIG. 7.

Figure 14:
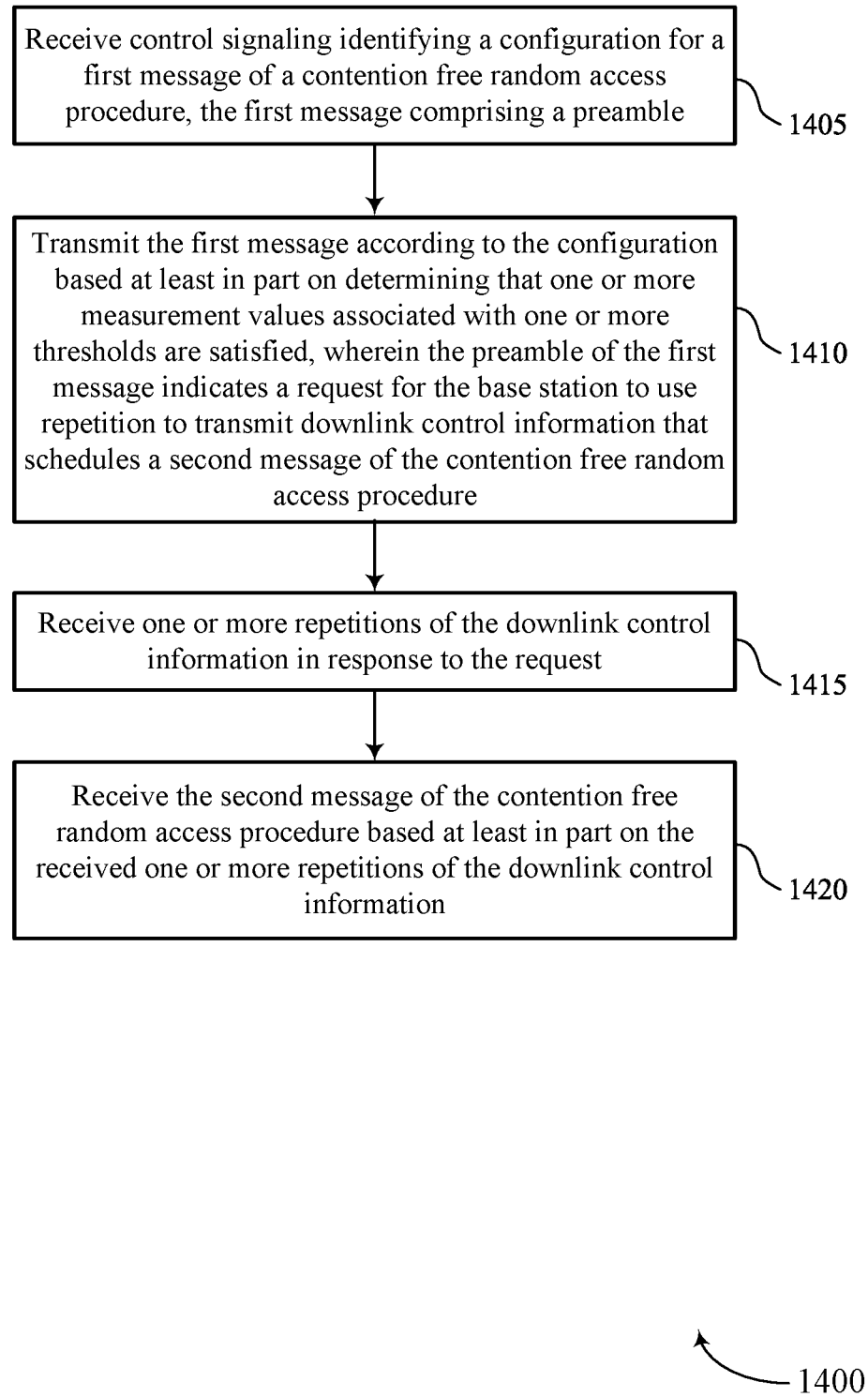

FIG. 14 shows a flowchart illustrating a method 1400 that supports message two control channel repetition for CFRA in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving control signaling identifying a configuration for a first message of a CFRA procedure, the first message including a preamble. The operations of 1405 may be performed in accordance with examples as disclosed herein. In some examples, aspects of the operations of 1405 may be performed by a control signaling receiver 725 as described with reference to FIG. 7.

At 1410, the method may include transmitting the first message according to the configuration based on determining that one or more measurement values associated with one or more thresholds are satisfied, where the preamble of the first message indicates a request for the base station to use repetition to transmit DCI that schedules a second message of the CFRA procedure. The operations of 1410 may be performed in accordance with examples as disclosed herein. In some examples, aspects of the operations of 1410 may be performed by a first message transmitter 730 as described with reference to FIG. 7.

At 1415, the method may include receiving one or more repetitions of the DCI in response to the request. The operations of 1415 may be performed in accordance with examples as disclosed herein. In some examples, aspects of the operations of 1415 may be performed by a repetition receiver 735 as described with reference to FIG. 7.

At 1420, the method may include receiving the second message of the CFRA procedure based on the received one or more repetitions of the DCI. The operations of 1420 may be performed in accordance with examples as disclosed herein. In some examples, aspects of the operations of 1420 may be performed by a second message receiver 740 as described with reference to FIG. 7.

Figure 15:
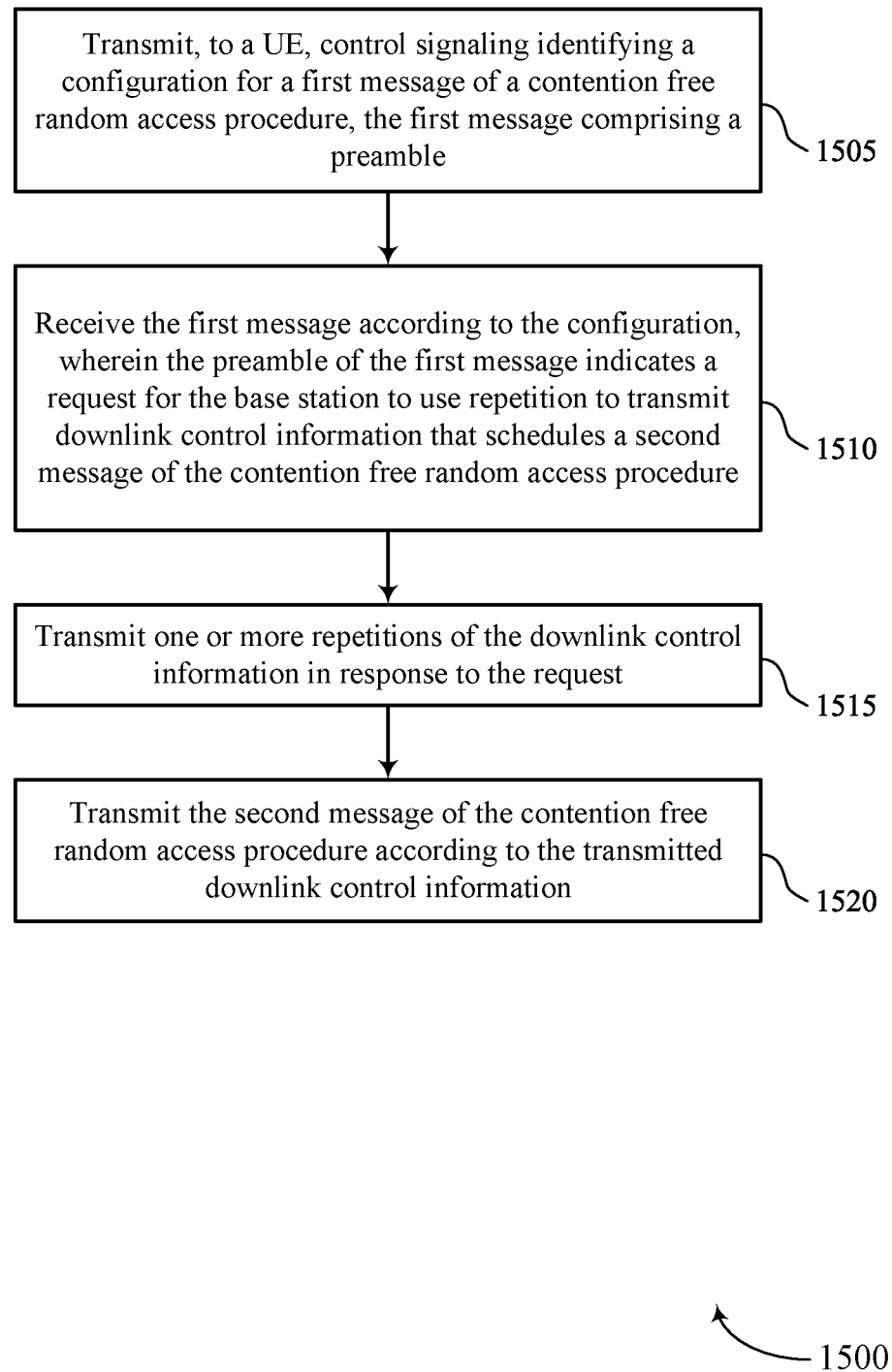

FIG. 15 shows a flowchart illustrating a method 1500 that supports message two control channel repetition for CFRA in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include transmitting, to a UE, control signaling identifying a configuration for a first message of a CFRA procedure, the first message including a preamble. The operations of 1505 may be performed in accordance with examples as disclosed herein. In some examples, aspects of the operations of 1505 may be performed by a control signaling transmitter 1125 as described with reference to FIG. 11.

At 1510, the method may include receiving the first message according to the configuration, where the preamble of the first message indicates a request for the base station to use repetition to transmit DCI that schedules a second message of the CFRA procedure. The operations of 1510 may be performed in accordance with examples as disclosed herein. In some examples, aspects of the operations of 1510 may be performed by a first message receiver 1130 as described with reference to FIG. 11.

At 1515, the method may include transmitting one or more repetitions of the DCI in response to the request. The operations of 1515 may be performed in accordance with examples as disclosed herein. In some examples, aspects of the operations of 1515 may be performed by a repetition transmitter 1135 as described with reference to FIG. 11.

At 1520, the method may include transmitting the second message of the CFRA procedure according to the transmitted DCI. The operations of 1520 may be performed in accordance with examples as disclosed herein. In some examples, aspects of the operations of 1520 may be performed by a second message transmitter 1140 as described with reference to FIG. 11.

Figure 16:
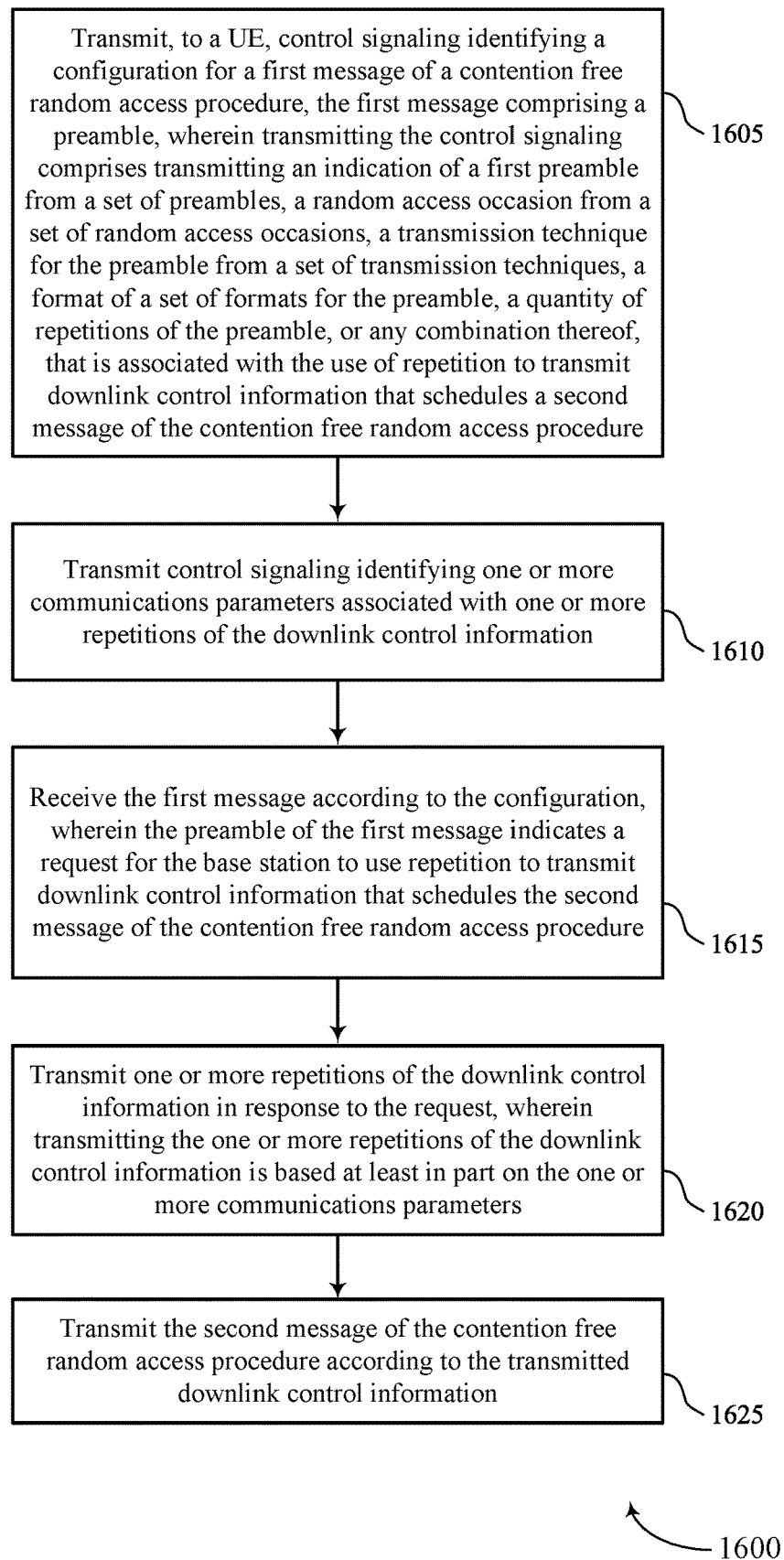

FIG. 16 shows a flowchart illustrating a method 1600 that supports message two control channel repetition for CFRA in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, control signaling identifying a configuration for a first message of a CFRA procedure, the first message including a preamble, where transmitting the control signaling comprises transmitting an indication of a first preamble from a set of preambles, a random access occasion from a set of random access occasions, a transmission technique for the preamble from a set of transmission techniques, a format of a set of formats for the preamble, a quantity of repetitions of the preamble, or any combination thereof, that is associated with the use of repetition to transmit DCI that schedules a second message of the CFRA procedure. The operations of 1605 may be performed in accordance with examples as disclosed herein. In some examples, aspects of the operations of 1605 may be performed by a control signaling transmitter 1125 as described with reference to FIG. 11.

At 1610, the method may include transmitting control signaling identifying one or more communications parameters associated with the one or more repetitions of the DCI. The operations of 1610 may be performed in accordance with examples as disclosed herein. In some examples, aspects of the operations of 1610 may be performed by a control signaling transmitter 1125 as described with reference to FIG. 11.

At 1615, the method may include receiving the first message according to the configuration, where the preamble of the first message indicates a request for the base station to use repetition to transmit DCI that schedules the second message of the CFRA procedure. The operations of 1620 may be performed in accordance with examples as disclosed herein. In some examples, aspects of the operations of 1620 may be performed by a first message receiver 1130 as described with reference to FIG. 11.

At 1620, the method may include transmitting one or more repetitions of the DCI in response to the request, where transmitting the one or more repetitions of the DCI is based on the one or more communications parameters. The operations of 1620 may be performed in accordance with examples as disclosed herein. In some examples, aspects of the operations of 1620 may be performed by a repetition transmitter 1135 as described with reference to FIG. 11.

At 1625, the method may include transmitting the second message of the CFRA procedure according to the transmitted DCI. The operations of 1625 may be performed in accordance with examples as disclosed herein. In some examples, aspects of the operations of 1625 may be performed by a second message transmitter 1140 as described with reference to FIG. 11.

The following provides an overview of aspects of the present disclosure:

Aspect 1: A method for wireless communications at a UE, comprising: receiving control signaling identifying a configuration for a first message of a CFRA procedure, the first message comprising a preamble; transmitting the first message according to the configuration, wherein the preamble of the first message indicates a request for the base station to use repetition to transmit DCI that schedules a second message of the CFRA procedure; receiving one or more repetitions of the DCI in response to the request; and receiving the second message of the CFRA procedure based at least in part on the received one or more repetitions of the DCI.

Aspect 2: The method of aspect 1, wherein receiving the control signaling identifying the configuration for the first message comprises: receiving an indication of a first preamble from a set of preambles, a random access occasion from a set of random access occasions, a transmission technique for the preamble from a set of transmission techniques, a format of a set of formats for the preamble, a quantity of repetitions of the preamble, or any combination thereof, that is associated with the use of repetition to transmit the DCI that schedules the second message.

Aspect 3: The method of any of aspects 1 through 2, wherein transmitting the first message based at least in part on the configuration comprises: transmitting the first message indicating the request based at least in part on determining that one or more measurement values associated with one or more thresholds are satisfied.

Aspect 4: The method of aspect 3, further comprising: determining an RSRP value based at least in part on a measurement value of a synchronization signal received from the base station; and comparing the RSRP value with the one or more thresholds to determine the measurement value.

Aspect 5: The method of any of aspects 3 through 4, wherein the one or more measurement values, the one or more thresholds, or both are based at least in part on one or more CSI measurements performed before a start of the CFRA procedure.

Aspect 6: The method of any of aspects 3 through 5, wherein the configuration includes an indication of the one or more thresholds.

Aspect 7: The method of any of aspects 1 through 6, further comprising: receiving control signaling identifying one or more communications parameters associated with the one or more repetitions of the DCI, wherein receiving the one or more repetitions of the DCI is based at least in part on the one or more communications parameters.

Aspect 8: The method of aspect 7, wherein the one or more communications parameters comprise a frequency hopping pattern, a beam sweeping pattern, a quantity of the one or more repetitions, a grouping of monitoring occasions, or any combination thereof.

Aspect 9: The method of any of aspects 1 through 8, wherein transmitting the first message comprises: transmitting the first message based at least in part on the configuration and one or more of a frequency range, a subcarrier spacing, a deployment mode, or any combination thereof.

Aspect 10: The method of any of aspects 1 through 9, further comprising: transmitting an indication of a capability of the UE to receive the one or more repetitions of the DCI that schedules the second message of the CFRA procedure, wherein transmitting the first message indicating the request is based at least in part on the capability.

Aspect 11: The method of any of aspects 1 through 10, further comprising: monitoring, after transmitting the request for the base station to use repetition to transmit the DCI, both a first set of resources for the one or more repetitions of the DCI and a second set of resources for a single instance of the DCI, the one or more repetitions of the DCI received based at least in part on the monitoring.

Aspect 12: The method of any of aspects 1 through 11, wherein transmitting the first message comprises: transmitting the first message, wherein the preamble of the first message comprises an indication for the UE to transmit, to the base station, a third message of the CFRA procedure using repetition, wherein the indication for the UE to transmit the third message using repetition indicates the request for the base station to use repetition to transmit the DCI that schedules the second message.

Aspect 13: A method for wireless communications at a base station, comprising: transmitting, to a UE, control signaling identifying a configuration for a first message of a CFRA procedure, the first message comprising a preamble; receiving the first message according to the configuration, wherein the preamble of the first message indicates a request for the base station to use repetition to transmit DCI that schedules a second message of the CFRA procedure; transmitting one or more repetitions of the DCI in response to the request; and transmitting the second message of the CFRA procedure according to the transmitted DCI.

Aspect 14: The method of aspect 13, wherein transmitting the control signaling identifying the configuration for the first message comprises: transmitting an indication of a first preamble from a set of preambles, a random access occasion from a set of random access occasions, a transmission technique for the preamble from a set of transmission techniques, a format of a set of formats for the preamble, a quantity of repetitions of the preamble, or any combination thereof, that is associated with the use of repetition to transmit the DCI that schedules the second message.

Aspect 15: The method of any of aspects 13 through 14, wherein receiving the first message based at least in part on the configuration comprises: receiving the first message indicating the request based at least in part on one or more measurement values associated with one or more thresholds being satisfied.

Aspect 16: The method of aspect 15, wherein the configuration includes an indication of the one or more thresholds.

Aspect 17: The method of any of aspects 13 through 16, further comprising: transmitting control signaling identifying one or more communications parameters associated with the one or more repetitions of the DCI, wherein transmitting the one or more repetitions of the DCI is based at least in part on the one or more communications parameters.

Aspect 18: The method of aspect 17, wherein the one or more communications parameters comprise a frequency hopping pattern, a beam sweeping pattern, a quantity of the one or more repetitions, a grouping of monitoring occasions, or any combination thereof.

Aspect 19: The method of any of aspects 13 through 18, wherein receiving the first message comprises: receiving the first message based at least in part on the configuration and one or more of a frequency range, a subcarrier spacing, a deployment mode, or any combination thereof.

Aspect 20: The method of any of aspects 13 through 19, further comprising: receiving an indication of a capability of the UE to receive the one or more repetitions of the DCI that schedules the second message of the CFRA procedure.

Aspect 21: The method of any of aspects 13 through 20, wherein receiving the first message comprises: receiving the first message, wherein the preamble of the first message comprises an indication for the UE to transmit, to the base station, a third message of the CFRA procedure using repetition, wherein the indication for the UE to transmit the third message using repetition indicates the request for the base station to use repetition to transmit the DCI that schedules the second message.

Aspect 22: An apparatus for wireless communications at a UE, comprising a processor; memory coupled with the processor; and instructions stored in the memory and executable by the processor to cause the apparatus to perform a method of any of aspects 1 through 12.

Aspect 23: An apparatus for wireless communications at a UE, comprising at least one means for performing a method of any of aspects 1 through 12.

Aspect 24: A non-transitory computer-readable medium storing code for wireless communications at a UE, the code comprising instructions executable by a processor to perform a method of any of aspects 1 through 12.

Aspect 25: An apparatus for wireless communications at a base station, comprising a processor; memory coupled with the processor; and instructions stored in the memory and executable by the processor to cause the apparatus to perform a method of any of aspects 13 through 21.

Aspect 26: An apparatus for wireless communications at a base station, comprising at least one means for performing a method of any of aspects 13 through 21.

Aspect 27: A non-transitory computer-readable medium storing code for wireless communications at a base station, the code comprising instructions executable by a processor to perform a method of any of aspects 13 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
 a processor;
 memory coupled with the processor; and
 instructions stored in the memory and executable by the processor to cause the apparatus to:
  receive control signaling identifying a configuration for a first message of a contention free random access procedure, the first message comprising a preamble;
  transmit the first message according to the configuration, wherein the preamble of the first message indicates a request for the base station to use repetition to transmit downlink control information that schedules a second message of the contention free random access procedure;
  receive one or more repetitions of the downlink control information in response to the request; and
  receive the second message of the contention free random access procedure based at least in part on the received one or more repetitions of the downlink control information.

2. The apparatus of claim 1, wherein the instructions to receive the control signaling identifying the configuration for the first message are executable by the processor to cause the apparatus to:
receive an indication of a first preamble from a set of preambles, a random access occasion from a set of random access occasions, a transmission technique for the preamble from a set of transmission techniques, a format of a set of formats for the preamble, a quantity of repetitions of the preamble, or any combination thereof, that is associated with the use of repetition to transmit the downlink control information that schedules the second message.

3. The apparatus of claim 1, wherein the instructions to transmit the first message based at least in part on the configuration are executable by the processor to cause the apparatus to:
transmit the first message indicating the request based at least in part on determining that one or more measurement values associated with one or more thresholds are satisfied.

4. The apparatus of claim 3, wherein the instructions are further executable by the processor to cause the apparatus to:
determine a reference signal received power value based at least in part on a measurement value of a synchronization signal received from the base station; and
compare the reference signal received power value with the one or more thresholds to determine the measurement value.

5. The apparatus of claim 3, wherein the one or more measurement values, the one or more thresholds, or both are based at least in part on one or more channel state information measurements performed before a start of the contention free random access procedure.

6. The apparatus of claim 3, wherein the configuration includes an indication of the one or more thresholds.

7. The apparatus of claim 1, wherein the instructions are further executable by the processor to cause the apparatus to:
receive control signaling identifying one or more communications parameters associated with the one or more repetitions of the downlink control information, wherein receiving the one or more repetitions of the downlink control information is based at least in part on the one or more communications parameters.

8. The apparatus of claim 7, wherein the one or more communications parameters comprise a frequency hopping pattern, a beam sweeping pattern, a quantity of the one or more repetitions, a grouping of monitoring occasions, or any combination thereof.

9. The apparatus of claim 1, wherein the instructions to transmit the first message are executable by the processor to cause the apparatus to:
transmit the first message based at least in part on the configuration and one or more of a frequency range, a subcarrier spacing, a deployment mode, or any combination thereof.

10. The apparatus of claim 1, wherein the instructions are further executable by the processor to cause the apparatus to:
transmit an indication of a capability of the UE to receive the one or more repetitions of the downlink control information that schedules the second message of the contention free random access procedure, wherein transmitting the first message indicating the request is based at least in part on the capability.

11. The apparatus of claim 1, wherein the instructions are further executable by the processor to cause the apparatus to:
monitor, after transmitting the request for the base station to use repetition to transmit the downlink control information, both a first set of resources for the one or more repetitions of the downlink control information and a second set of resources for a single instance of the downlink control information, the one or more repetitions of the downlink control information received based at least in part on the monitoring.

12. The apparatus of claim 1, wherein the instructions to transmit the first message are executable by the processor to cause the apparatus to:
transmit the first message, wherein the preamble of the first message comprises an indication for the UE to transmit, to the base station, a third message of the contention free random access procedure using repetition, wherein the indication for the UE to transmit the third message using repetition indicates the request for the base station to use repetition to transmit the downlink control information that schedules the second message.

13. An apparatus for wireless communications at a base station, comprising:
a processor;
memory coupled with the processor; and
instructions stored in the memory and executable by the processor to cause the apparatus to:
transmit, to a user equipment (UE), control signaling identifying a configuration for a first message of a contention free random access procedure, the first message comprising a preamble;
receive the first message according to the configuration, wherein the preamble of the first message indicates a request for the base station to use repetition to transmit downlink control information that schedules a second message of the contention free random access procedure;
transmit one or more repetitions of the downlink control information in response to the request; and
transmit the second message of the contention free random access procedure according to the transmitted downlink control information.

14. The apparatus of claim 13, wherein the instructions to transmit the control signaling identifying the configuration for the first message are executable by the processor to cause the apparatus to:
transmit an indication of a first preamble from a set of preambles, a random access occasion from a set of random access occasions, a transmission technique for the preamble from a set of transmission techniques, a format of a set of formats for the preamble, a quantity of repetitions of the preamble, or any combination thereof, that is associated with the use of repetition to transmit the downlink control information that schedules the second message.

15. The apparatus of claim 13, wherein the instructions to receive the first message based at least in part on the configuration are executable by the processor to cause the apparatus to:
receive the first message indicating the request based at least in part on one or more measurement values associated with one or more thresholds being satisfied.

16. The apparatus of claim 15, wherein the configuration includes an indication of the one or more thresholds.

17. The apparatus of claim 13, wherein the instructions are further executable by the processor to cause the apparatus to:

transmit control signaling identifying one or more communications parameters associated with the one or more repetitions of the downlink control information, wherein transmitting the one or more repetitions of the downlink control information is based at least in part on the one or more communications parameters.

18. The apparatus of claim 17, wherein the one or more communications parameters comprise a frequency hopping pattern, a beam sweeping pattern, a quantity of the one or more repetitions, a grouping of monitoring occasions, or any combination thereof.

19. The apparatus of claim 13, wherein the instructions to receive the first message are executable by the processor to cause the apparatus to:
receive the first message based at least in part on the configuration and one or more of a frequency range, a subcarrier spacing, a deployment mode, or any combination thereof.

20. The apparatus of claim 13, wherein the instructions are further executable by the processor to cause the apparatus to:
receive an indication of a capability of the UE to receive the one or more repetitions of the downlink control information that schedules the second message of the contention free random access procedure.

21. The apparatus of claim 13, wherein the instructions to receive the first message are executable by the processor to cause the apparatus to:
receive the first message, wherein the preamble of the first message comprises an indication for the UE to transmit, to the base station, a third message of the contention free random access procedure using repetition, wherein the indication for the UE to transmit the third message using repetition indicates the request for the base station to use repetition to transmit the downlink control information that schedules the second message.

22. A method for wireless communications at a user equipment (UE), comprising:
receiving control signaling identifying a configuration for a first message of a contention free random access procedure, the first message comprising a preamble;
transmitting the first message according to the configuration, wherein the preamble of the first message indicates a request for the base station to use repetition to transmit downlink control information that schedules a second message of the contention free random access procedure;
receiving one or more repetitions of the downlink control information in response to the request; and
receiving the second message of the contention free random access procedure based at least in part on the received one or more repetitions of the downlink control information.

23. The method of claim 22, wherein receiving the control signaling identifying the configuration for the first message comprises:
receiving an indication of a first preamble from a set of preambles, a random access occasion from a set of random access occasions, a transmission technique for the preamble from a set of transmission techniques, a format of a set of formats for the preamble, a quantity of repetitions of the preamble, or any combination thereof, that is associated with the use of repetition to transmit the downlink control information that schedules the second message.

24. The method of claim 22, wherein transmitting the first message based at least in part on the configuration comprises:
transmitting the first message indicating the request based at least in part on determining that one or more measurement values associated with one or more thresholds are satisfied.

25. The method of claim 24, further comprising:
determining a reference signal received power value based at least in part on a measurement value of a synchronization signal received from the base station; and
comparing the reference signal received power value with the one or more thresholds to determine the measurement value.

26. The method of claim 24, wherein the one or more measurement values, the one or more thresholds, or both are based at least in part on one or more channel state information measurements performed before a start of the contention free random access procedure.

27. The method of claim 24, wherein the configuration includes an indication of the one or more thresholds.

28. The method of claim 22, further comprising:
receiving control signaling identifying one or more communications parameters associated with the one or more repetitions of the downlink control information, wherein receiving the one or more repetitions of the downlink control information is based at least in part on the one or more communications parameters.

29. A method for wireless communications at a base station, comprising:
transmitting, to a user equipment (UE), control signaling identifying a configuration for a first message of a contention free random access procedure, the first message comprising a preamble;
receiving the first message according to the configuration, wherein the preamble of the first message indicates a request for the base station to use repetition to transmit downlink control information that schedules a second message of the contention free random access procedure;
transmitting one or more repetitions of the downlink control information in response to the request; and
transmitting the second message of the contention free random access procedure according to the transmitted downlink control information.

30. The method of claim 29, wherein transmitting the control signaling identifying the configuration for the first message comprises:
transmitting an indication of a first preamble from a set of preambles, a random access occasion from a set of random access occasions, a transmission technique for the preamble from a set of transmission techniques, a format of a set of formats for the preamble, a quantity of repetitions of the preamble, or any combination thereof, that is associated with the use of repetition to transmit the downlink control information that schedules the second message.

* * * * *